US008740539B2

(12) United States Patent
Ablabutyan

(10) Patent No.: US 8,740,539 B2
(45) Date of Patent: Jun. 3, 2014

(54) LIFT GATE LOAD ELEVATOR WITH COLUMNAR POWER ASSEMBLIES

(75) Inventor: Karapet Ablabutyan, Glendale, CA (US)

(73) Assignee: Maxon Industries, Inc., Santa Fe Springs, CA (US)

( * ) Notice: Subject to any disclaimer, the term of this patent is extended or adjusted under 35 U.S.C. 154(b) by 607 days.

(21) Appl. No.: 12/945,628

(22) Filed: Nov. 12, 2010

(65) Prior Publication Data

US 2012/0121369 A1 May 17, 2012

(51) Int. Cl.
*B60P 1/46* (2006.01)
(52) U.S. Cl.
USPC ........................................... 414/545
(58) Field of Classification Search
USPC .................. 414/540–545; 187/240, 244
See application file for complete search history.

(56) References Cited

U.S. PATENT DOCUMENTS

| 1,931,237 | A | | 10/1933 | O'Connell | |
|---|---|---|---|---|---|
| 2,908,408 | A | * | 10/1959 | Reed, Jr. | 414/545 |
| 4,563,121 | A | * | 1/1986 | Drews | 414/545 |
| 5,176,226 | A | * | 1/1993 | Martin et al. | 187/242 |
| 5,251,922 | A | | 10/1993 | Mann | |
| 5,263,808 | A | * | 11/1993 | Kent | 414/545 |
| 5,513,943 | A | | 5/1996 | Lugash et al. | |
| 5,597,282 | A | * | 1/1997 | Hoffman et al. | 414/545 |
| 6,536,984 | B1 | | 3/2003 | Ring et al. | |
| 7,568,877 | B1 | * | 8/2009 | Nespor | 414/545 |
| 2010/0104365 | A1 | | 4/2010 | Wood, II et al. | |

FOREIGN PATENT DOCUMENTS

GB 2312662 A 11/1997

OTHER PUBLICATIONS

International Search Report and Written Opinion dated 16 Mar. 2012 for International Application No. PCT/US2011/060054 from International Searching Authority, pp. 1-14, Alexandria, United States of America.
International Preliminary Report on Patentability and Written Opinion dated May 23, 2013 for International Application No. PCT/US2011/060054 from International Bureau of WIPO, pp. 1-10, Geneva, Switzerland.

* cited by examiner

*Primary Examiner* — Jonathan Snelting
(74) *Attorney, Agent, or Firm* — Michael Zarrabian, Esq.; Sherman & Zarrabian LLP

(57) ABSTRACT

A lifting system includes a vertically extending parallel pair of fixedly spaced apart guide surfaces, a linear actuator suspended vertically between said pair of guide surfaces, a vertically elongate runner member having a pivotal connection to a lower end of said linear actuator to be vertically reciprocated by said actuator, a load bearing member at a lower end of said runner member at a location spaced downwardly from said pivotal connection and a vertically spaced apart pair of sliding contact members on said runner member for relatively slidable contact with said pair of guide surfaces during vertical reciprocation of said runner member by said actuator. Each of said contact members comprises a projecting contact pad having a concave surface for slidable contact with one of said guide surfaces.

13 Claims, 43 Drawing Sheets

LIFT GATE LOAD ELEVATOR WITH COLUMNAR POWER ASSEMBLIES

FIELD OF THE INVENTION

The present invention relates generally to load elevators or lifts and, more particularly, to hydraulically operated synchronized dual lift systems.

BACKGROUND OF THE INVENTION

A dual lift system may comprise a parallel pair of vertically extending standards, posts or columns, each having a vertically disposed hydraulic cylinder for vertically raising and lowering a load carried by the pair of cylinders. The pair of cylinders are actuated from a single source of hydraulic power and the hydraulic circuit contains a flow divider distributing hydraulic flow to each of the cylinders. Typically, the flow divider comprises a spool valve spanning the outlets to the pair of cylinders, the spool being counter-balanced by opposing springs at its opposite ends. This type of flow divider tends to lose its initial stabilizing setting over time, requires frequent readjustment, and is often unreliable in operation under conditions where the load is off-center relative to the pair of columns.

A load elevator has been used in the form of a liftgate comprising a rigid H-frame having a parallel pair of upstanding columns. The columns contain a corresponding pair of vertically disposed hydraulic cylinders having runners interconnected by a transverse heavy stabilizing bar typically supporting a two-section foldable platform actuated on each side by an actuating linkage system. However, the resulting H-frame is difficult to transport, and the heavy stabilizing bar prevents folding of the platform sections into a fully recessed condition wherein neither the platform sections nor the linkage system parts protrude beyond a rear plane of the pair of columns (requiring the driver to frequently reposition the vehicle away from a dock surface for added clearance to lower the folded platforms into a dock loading position). Further, the stabilizing bar typically results in a large gap between the dock and the interior of the vehicle body requiring use of a dock plate to span the gap.

There are also liftgates comprising a vertical pair of columns each containing a runner assembly mounted for vertical reciprocation within the columns. Each runner is typically engaged with interior tracks or surfaces of the companion column by means of rollers. The contact is typically steel on steel and thus induces high wear on the contacting parts and resulting misalignment of the runner assembly relative to its column.

BRIEF SUMMARY OF THE INVENTION

The present invention provides a lifting system with columnar power assemblies. In one embodiment the lifting system comprises a vertically extending parallel pair of fixedly spaced apart guide surfaces, and a linear actuator suspended vertically between said pair of guide surfaces. The lifting system further comprises a vertically elongate runner member having a pivotal connection to the lower end of said linear actuator to be vertically reciprocated by said actuator. The lifting system further comprises a load bearing member at a lower end of said runner member at a location spaced downwardly from said pivotal connection.

The lifting system further comprises a vertically spaced apart pair of sliding contact members on said runner member for relatively slidable contact with said pair of guide surfaces during vertical reciprocation of said runner member by said actuator, a first one of said contact members being mounted at an upper end of said runner member. The second of said contact members being mounted on an intermediate portion of said runner member between said first contact member and said pivotal connection, wherein said pair of contact members are mounted on opposite sides of said runner member for contact with opposite ones of said pair of guide surfaces.

Wherein each of said contact members comprises a projecting contact pad having a curved surface for slidable contact with one of said guide surfaces. Wherein each of said contact members comprises a self adjusting mounting mechanism configured such that each of said contact pads is pivotally mounted on the runner member, allowing axial displacement of each contact member relative to the corresponding one of said guide surfaces, for maintaining substantial uniform contact therebetween substantially throughout the axial width of said contact pad.

The lifting system further comprises a pair of clearance contact members corresponding to the sliding contact members, each clearance contact member mounted on the runner member opposite a corresponding sliding contact member, each clearance contact member for slidable contact with one of said guide surfaces.

In another embodiment the lifting system comprises a vertically extending parallel pair of fixedly spaced apart guide surfaces, a linear actuator suspended vertically between said pair of guide surfaces, a vertically elongate runner member having a pivotal connection to a lower end of said linear actuator to be vertically reciprocated by said actuator, and a load bearing member at a lower end of said runner member at a location spaced downwardly from said pivotal connection.

The lifting system further comprises a vertically spaced apart pair of sliding clearance members mounted on said runner member for relatively slidable contact with said pair of guide surfaces during vertical reciprocation of said runner member by said actuator, a first one of said sliding clearance members being mounted at an upper end of said runner member, a second of said sliding clearance members being mounted on an intermediate portion of said runner member between said first sliding clearance member and said pivotal connection, wherein said pair of sliding clearance members are mounted on opposite sides of said runner member for contact with opposite ones of said pair of guide surfaces.

Wherein each of said sliding clearance members comprises a projecting contact pad having a surface for slidable contact with one of said guide surfaces. Further, each of said sliding clearance members comprises an adjustable mounting mechanism for adjustably mounting the sliding clearance member on the runner member to maintain substantial uniform contact therebetween essentially throughout the axial width of said contact pad.

These and other features, aspects and advantages of the present invention will become understood with reference to the following description, appended claims and accompanying figures.

DETAILED DESCRIPTION OF THE INVENTION

The present invention provides a lifting system with columnar power assemblies. In one embodiment the lifting system includes a vertically extending parallel pair of fixedly spaced apart guide surfaces, a linear actuator suspended vertically between said pair of guide surfaces, a vertically elongate runner member having a pivotal connection to a lower end of said linear actuator to be vertically reciprocated by said actuator, a load bearing member at a lower end of said runner member at a location spaced downwardly from said pivotal connection and a vertically spaced apart pair of sliding contact members on said runner member for relatively slidable contact with said pair of guide surfaces during vertical reciprocation of said runner member by said actuator.

A first one of said contact members is mounted at an upper end of said runner member. The second of said contact members is mounted on an intermediate portion of said runner member between said first contact member and said pivotal connection, wherein said pair of contact members are mounted on opposite sides of said runner member for contact with opposite ones of said pair of guide surfaces. Each of said contact members comprises a projecting contact pad having a curved surface, such as concave or convex surface, for slidable contact with one of said guide surfaces.

Figure 1:
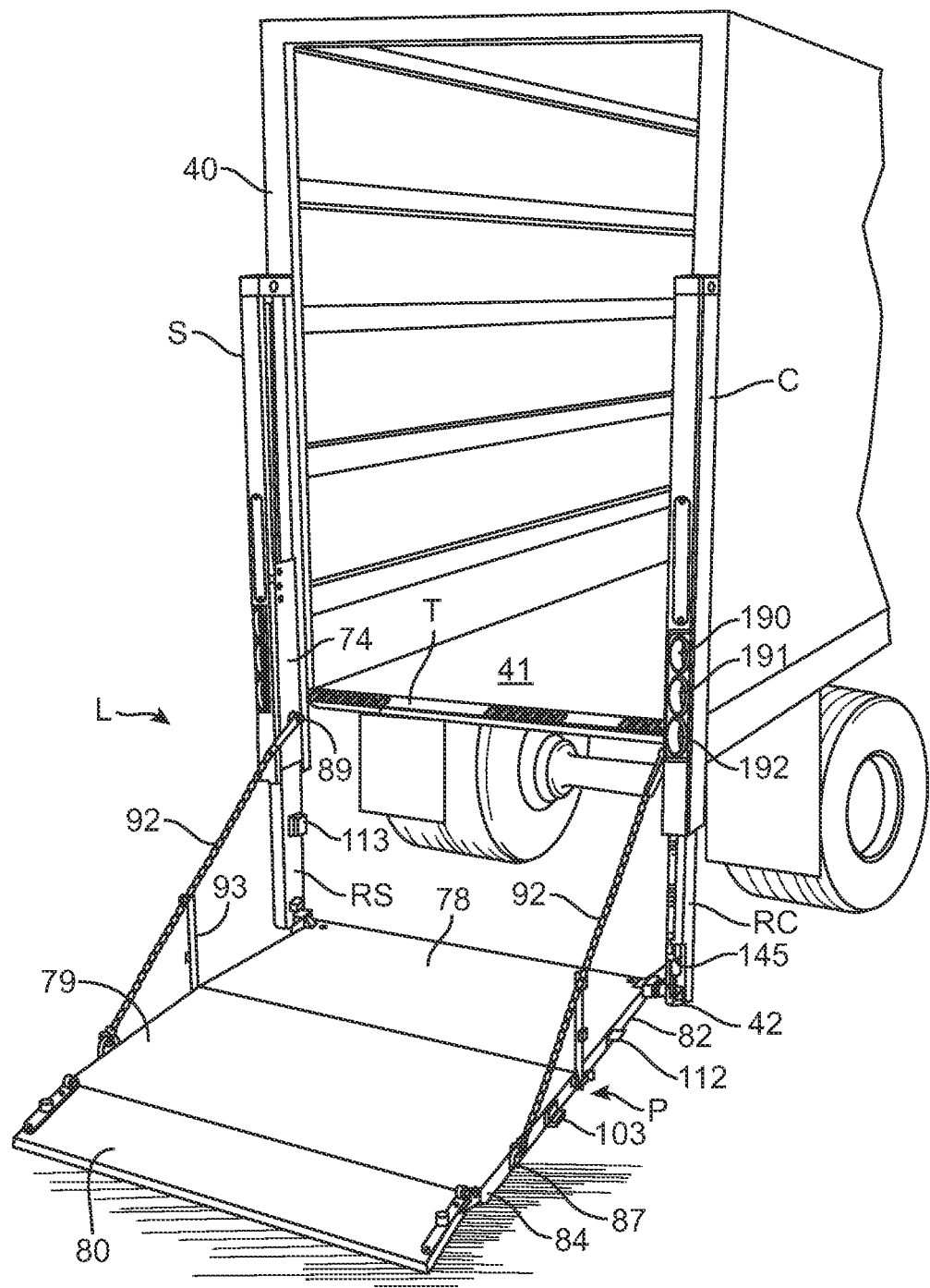
FIG. 1 is a perspective view of a lift gate mounted at the rear of a freight vehicle, according to an embodiment of the invention.

FIG. 1 shows an embodiment of the invention implemented in liftgate L. The liftgate is shown mounted on the rear vertical corner posts of the rear end opening of a truck, van, or trailer body 40. The liftgate L comprises a right hand or curb side columnar power assembly C, a left hand or street side columnar power assembly S, and a platform assembly P. The curb side columnar power assembly C mounts a downwardly extendable and upwardly retractable curb side runner assembly RC. The street side columnar power assembly S includes a companion downwardly extendable and vertically retractable street side runner assembly RS. Further, telescopically mounted runner assemblies RS and RC are hydraulically operable in unison for raising and lowering the platform assembly P between ground level and the level of a bed 41 of the truck, van, or trailer body 40. The liftgate L further comprises a threshold plate T secured in horizontally extending position to the rear edge of the bed 41. The threshold plate T has a triangular profile (i.e., cross-sectional configuration) rigidly secured, as by welding, to the sill of the truck bed such that one flat face of the plate comprises a flush extension of the bed 41.

Figure 4:
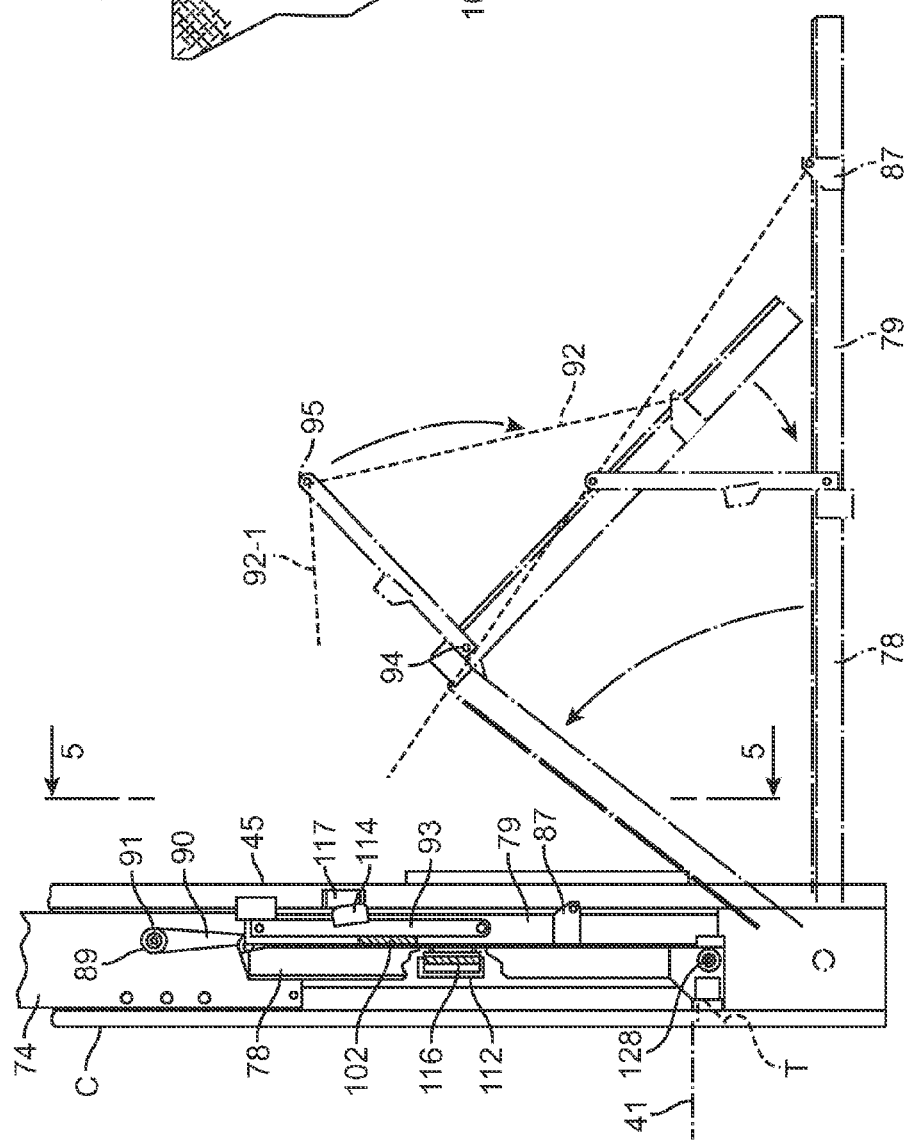
FIG. 4 is a partial elevational view of the inside of the curb side columnar assembly and the fully raised and folded platform assembly but also showing, in dotted outlines, fully horizontally extended and intermediate partly folded positions of the partially lowered platform assembly, according to an embodiment of the invention.

FIG. 4 shows a partial elevational view of the inside of the curb side columnar power assembly C and the fully raised and folded platform assembly P but also showing, in dotted outlines, fully horizontally extended and intermediate partly folded positions of the partially lowered platform assembly P, according to an embodiment of the invention. Generally, the columnar power assemblies C and S may be mirror image assemblies of identical components. In one embodiment, the curb side power assembly C differs however, in that the lower end portion of its runner assembly RC is fitted with a preferably hydraulically powered crank mechanism, designated generally by the numeral 42, to effect rotation of the platform sections through the various stages indicated in FIG. 4. Accordingly, in the ensuing description, like components of the pair of columnar power assemblies C and S will be identified by the same numeral.

Figure 5:
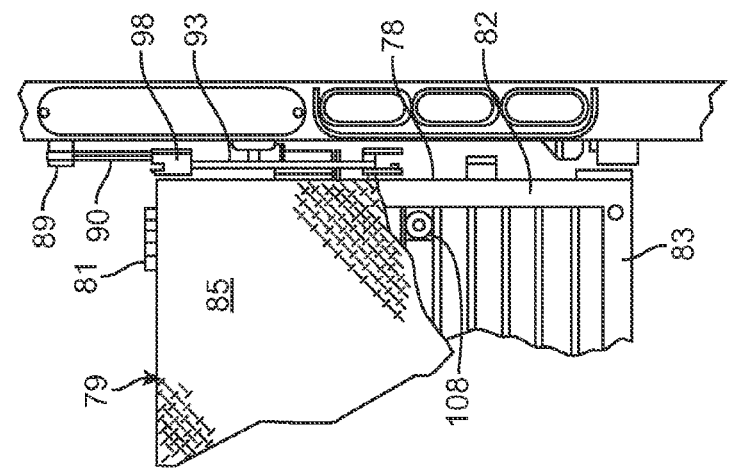
FIG. 5 is a partial elevational view on the line 5-5 of FIG. 4, with parts broken away, showing a clearance recess at one side of the folded platform, according to an embodiment of the invention.

The platform assembly P is illustrative of one of several different kinds of platforms that may be employed with the lift of this invention. FIG. 5 is a partial elevational view on the line 5-5 of FIG. 4, with parts broken away, showing a clearance recess at one side of the folded platform assembly P, according to an embodiment of the invention. In the illustrated case, the platform assembly P comprises a main or forward platform section 78 and a rear platform section 79 that, along its rear edge, is fitted with a retention ramp 80.

At opposite sides of its forward edge the main section 78 is pivotally supported by the bearings 75 (FIG. 15) for rotation between the horizontally extending position illustrated and a vertically erect position between the runner assemblies RC and RS.

The adjoining edges of the main platform section 78 and rear platform section 79 are pivotally interconnected by a butt hinge means 81 (FIG. 5) so oriented that when the main platform section 78 is turned upwardly from the FIG. 1 position, the underside of the rear platform section 79 swings toward the underside of the main platform section 78 as indicated in FIG. 4. The retention ramp 80 may be of the type that is invertible and latchable over the top or load surface at the rear end of the rear platform section 79. However, it should be understood that the pair of lifting columns of this invention have utility with single piece platforms and types of multi-piece platforms other than that depicted in FIG. 1.

Figure 12:
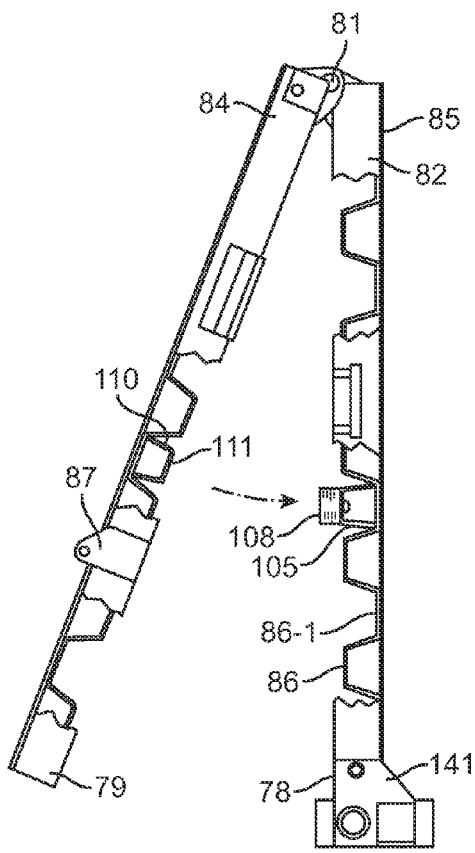
FIG. 12 is a side elevational view of the foldable platform sections in an angularly separated condition, portions being cut away to illustrate interior details of construction, according to an embodiment of the invention.

As shown in FIG. 5, the main platform section 78 comprises a rigid rectangular frame, preferably made of structural tubing of a square cross section, including opposite side frame members 82 and a transverse pair of forward and rear edge frame members 83. FIG. 12 is a side elevational view of the foldable platform sections 78, 79, in an angularly separated condition, portions being cut away to illustrate interior details of construction, according to an embodiment of the invention. The rear platform section 79 has a similar frame, including a pair of opposite side frame members 82, 84. Both frames are covered on their top side by a rectangular sheet metal skin 85, which may be diamond plate, welded to the underlying frame.

Each of the platform sections 78 and 79 is further structurally reinforced by a single seamless rectangular sheet 86 of corrugated metal on the underside thereof, congruently fitted within and, at peripheral portions, welded to the corresponding platform frame. Thus, the corrugated metal sheet 86 preferably is of the section or profile shown in FIG. 12 comprising flat crests and flat roots 86-1, the root sections being welded at spaced intervals therealong to the underside of the platform skin 85. The effect is thus one of a plurality of laterally spaced apart transverse hollow beams defined by the corrugated sheet that rigidly support loads placed on the platform surface.

Rotation of the main platform section 78 between vertical and horizontal positions is effected by the powered crank means 42. In order to effect corresponding rotation of the rear platform section 79, a collapsible linkage system is provided that is interconnected between the platform sections 78,79 and the runner assemblies RC and RS.

Figure 15:
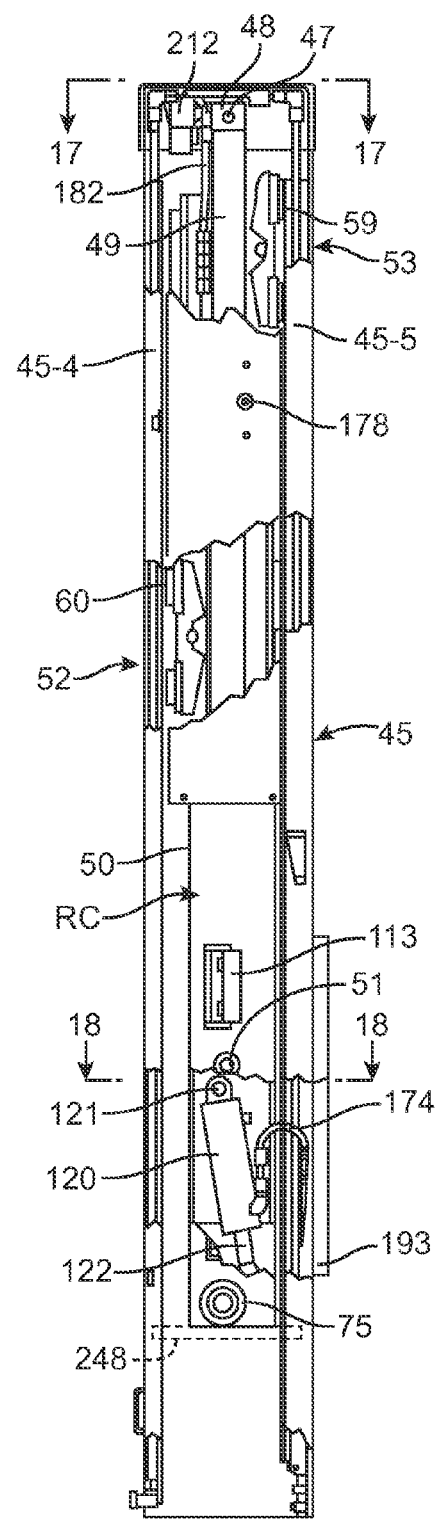
FIG. 15 is an elevational view of the inside of the curb side columnar assembly when its runner assembly is in a fully retracted position, with parts cut away to show interior details of construction and the curb side power mechanism for folding and unfolding of the platform sections, according to an embodiment of the invention.
Figure 16:
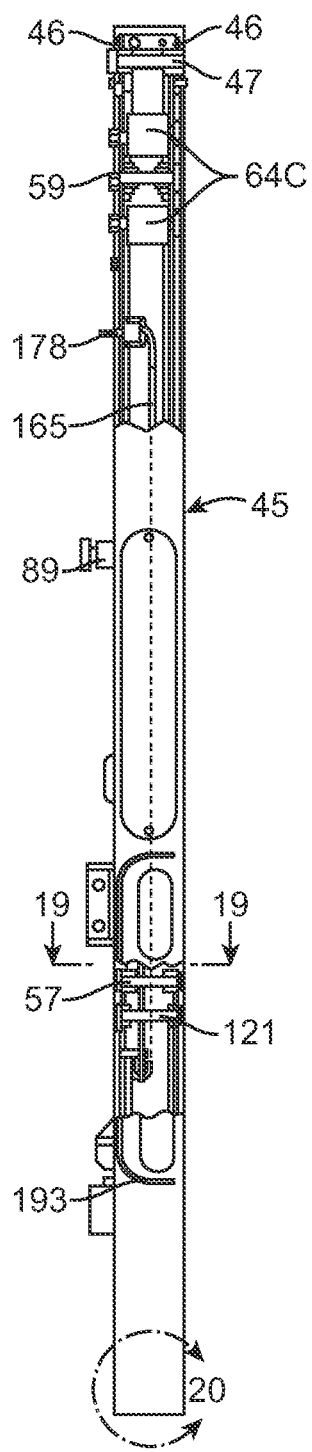
FIG. 16 is a rear elevational view of the columnar assembly of FIG. 15, portions being cut away to illustrate interior details of construction, according to an embodiment of the invention.

FIG. 15 is an elevational view of the inside of the curb side columnar power assembly C when its runner assembly RC is in a fully retracted position, with parts cut away to show interior details of construction and the curb side power mechanism for folding and unfolding of the platform sections 78, 79 (FIG. 4), according to an embodiment of the invention. FIG. 16 is a rear elevational view of the curb side columnar power assembly C of FIG. 15, portions being cut away to illustrate interior details of construction, according to an embodiment of the invention.

Figure 18:
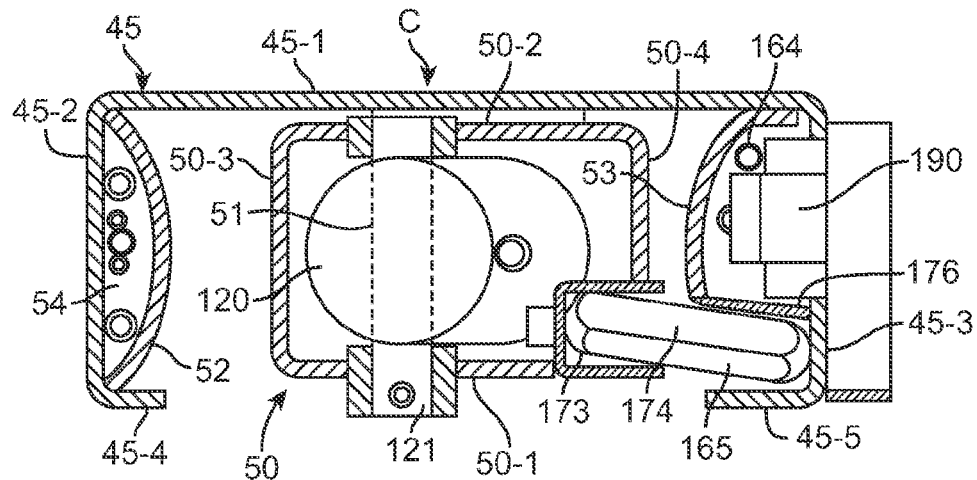
FIG. 18 is a transverse sectional view taken on the line 18-18 of FIG. 15, according to an embodiment of the invention.
Figures 19, 20:
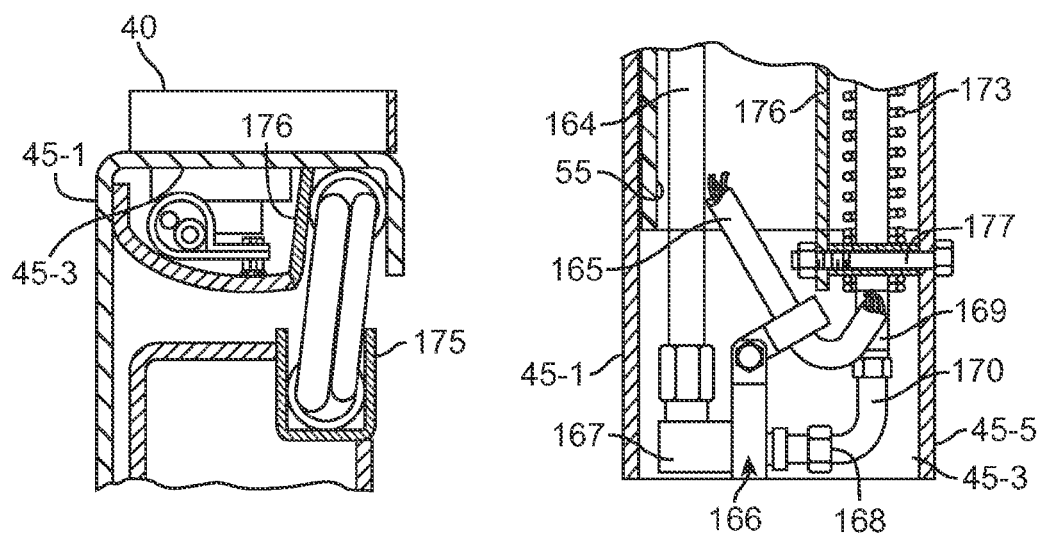
FIG. 19 is a partial sectional view taken on the line 19-19 of FIG. 16, according to an embodiment of the invention.
FIG. 20 is a partial vertical sectional view taken of the area 20 of FIG. 16, according to an embodiment of the invention.

FIG. 18 is a transverse sectional view taken on the line 18-18 of FIG. 15, according to an embodiment of the invention. FIG. 19 is a partial sectional view taken on the line 19-19 of FIG. 16, according to an embodiment of the invention. FIG. 20 is a partial vertical sectional view taken of the area 20 of FIG. 16, according to an embodiment of the invention.

Referring to FIGS. 1, 4 and 18-20, each of the columnar power assemblies C and S comprises a vertically elongate metal channel or column 45 having a block C-shaped profile. Each column has a web section 45-1, a front or forward wall 45-2, and a rear wall 45-3. The walls 45-2 and 45-3 are parallel to another and, along their edges remote from the web section 45-1, are integrally formed with inwardly turned flanges 45-4 and 45-5, respectively, disposed parallel to the web 45-1.

As is shown in FIG. 18, the flanges 45-4 and 45-5 are relatively narrow and thus define a wide clearance gap between the confronting parallel edges thereof. When the components of the liftgate are mounted on a truck body 40, the front or forward wall 45-2 of the corresponding column is fitted on the rear face of the corresponding rear corner post of the rear end opening of the vehicle as by welding or bolting thereto. Further, as indicated in FIGS. 18-19, when mounted in place, the rear wall 45-3 of the column 45 is substantially flush with the corresponding side of the van body 40 and the elongate clearance gaps between flanges 45-4 and 45-5 of the parallel pair of columnar power assemblies C and S confront one another (FIG. 1).

Under a box-like column cap 44 (FIG. 14), the upper end of each column 45 rigidly mounts a parallel spaced apart pair of upstanding power cylinder support plates 46 (FIG. 16), oriented parallel to the major axis of the column profile having opposite ends resting on the column front and rear walls 45-2 and 45-3. The power cylinder support plates 46 are formed with coaxial holes to seat opposite ends of a transversely oriented cylinder support pin 47. The cylinder support pin 47 pivotally supports a cap 48 comprising the butt end of an elongate fluid-powered linear actuator or cylinder 49 (FIG. 15) that is thus suspended from the cylinder support pin 47 to hang within the cavity of the column 45 so that the lower end of the power cylinder is displaceable in a direction parallel to said major axis of the column 45. The cylinder 49 may be of either the single or double acting type and encloses a piston-powered rod 57 (FIG. 16) that is extendable and retractable through the lower end of the cylinder 49.

Figure 14:
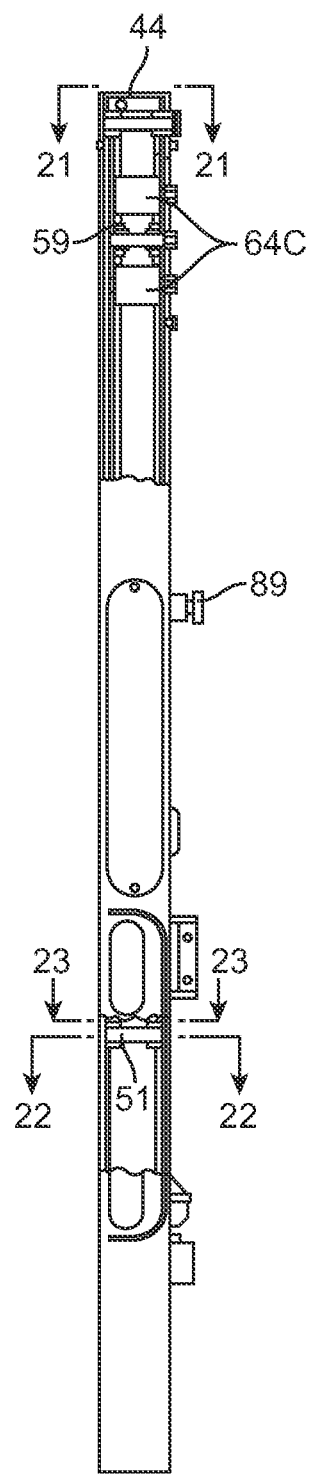
FIG. 14 is a rear elevational view of a columnar assembly, portions being cut away to show interior details of construction, according to an embodiment of the invention.
Figure 22:
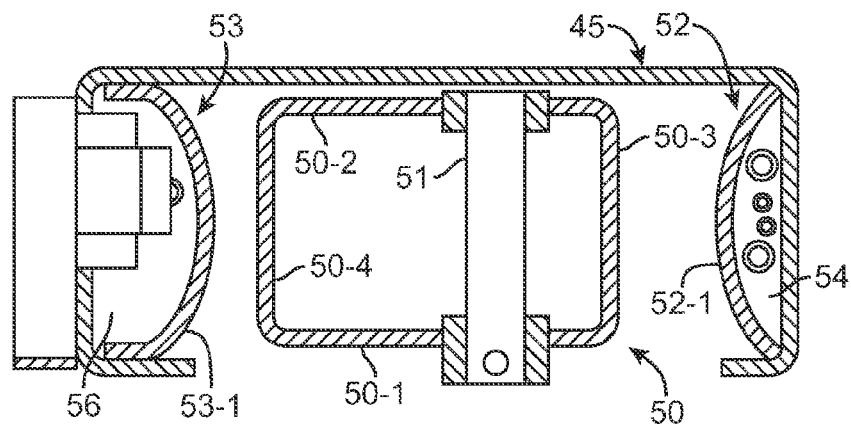
FIG. 22 is a sectional view taken on the line 22-22 of FIG. 14, according to an embodiment of the invention.

Also mounted within each column 45 is a tubular runner member 50 preferably having the rectangular cross-sectional configuration shown in FIG. 22. The vertically elongate runner member 50 is of a length such that when it is in the fully extended position of FIG. 1 a major portion of the length of the runner remains supported within the corresponding column 45. The runner member 50 is suspended from the piston-powered rod 57 by means of a runner support pin 51 having opposite ends journalled in an opposite pair of sidewalls of the runner member 50 on an axis parallel to that of the cylinder support pin 47. As is indicated in FIGS. 14, 15 and 16, the runner support pin 51 is located within a lower end portion of the runner member 50.

The major axis of the profile of tubular runner member 50 is parallel to the major profile axis of the corresponding column 45 so that an opposite parallel pair of sidewalls 50-1 and 50-2 of the runner are parallel to the web section 45-1 of the corresponding column 45. The major axis of the runner member 50 is substantially shorter than that of the profile of the corresponding column 45 such that there is a substantial clearance between the front and rear faces 50-3 and 50-4 (FIG. 18) of the runner member 50 and corresponding front and rear faces 45-2 and 45-3 respectively of the corresponding column 45. Within these clearances, the column 45 is fitted with an elongate front guide track 52 and a rear guide track 53 (FIG. 15).

The front and rear guide tracks 52, 53 extend over substantially all of the vertical length of the corresponding column 45. The front guide track 52 is fitted between and within the internal corners of the front wall 45-2 of the column 45 as by having opposite edges of the track welded to the internal corners of the column 45. The track is of uniform arcuate cross-sectional configuration from end-to-end having an outwardly convex track surface 52-1 of a uniform radius (e.g., about 3 inches or 7.62 centimeters), from side-to-side or edge-to-edge of the member. At the same time, a clearance passage 54 is defined between the front guide track 52 and the front wall 45-2 of the channel 45 through which hydraulic conduits and electrical wires can be passed from one end to the other of the track.

Similarly, the rear guide track 53 is fitted into the internal opposite corners at the rear wall 45-3 of the corresponding channel 45. The rear guide track 53 also has an outwardly convex track surface 53-1, preferably of the same uniform radius from side-to-side as the track surface 52-1. However, opposite longitudinal edges of the rear guide track 53 develop into an opposite pair of straight flanges 55 (FIG. 20) whereby the track defines a clearance passage 56 relative to the rear wall 45-3 of the channel 45 that is of a larger cross-sectional area than the clearance passage 54 at the front wall 45-2.

In order to support the platform assembly P on the runner assemblies RC and RS, the lower end of each runner assembly RC, RS is provided on the lower end of its inside face with a bearing designated generally by the numeral 75. It will be understood that the pair of bearings 75 are coaxially related. As shown in FIG. 15, each bearing 75 has its axis closer to the front wall 50-3 of the corresponding canted runner such that its axis, the axis of the runner support pin 51 and the axis of the cylinder support pin 47 are all aligned substantially along the mid-line of the corresponding columnar assembly C or S.

Figure 6:
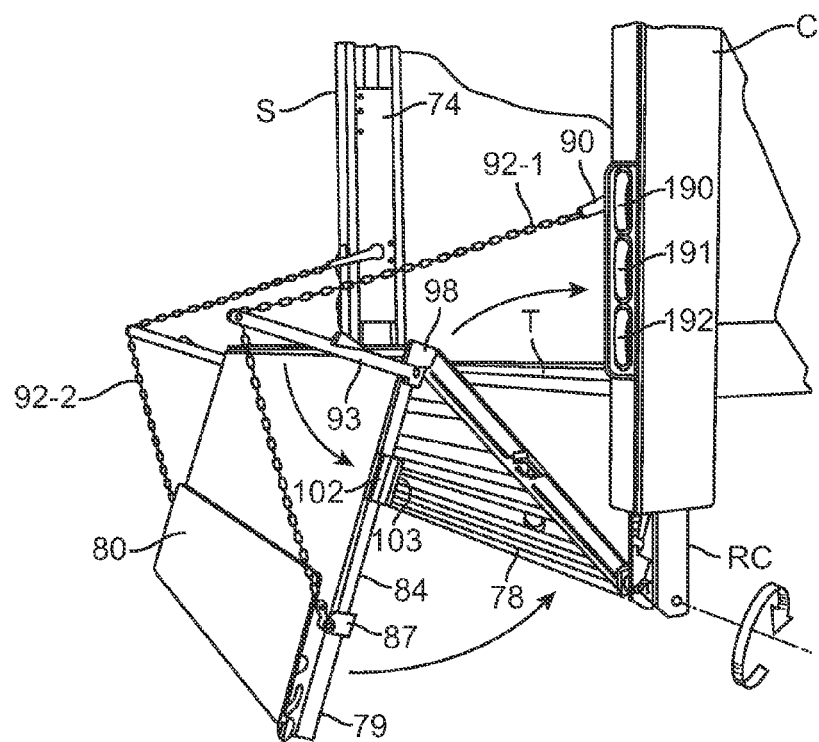
FIG. 6 is a perspective view of the liftgate of FIG. 1 but with the platform sections in substantially the intermediate position indicated in dotted outline in FIG. 4, according to an embodiment of the invention.

Referring to FIGS. 1, 4 and 6, the inside face of each runner and cover assembly has an inwardly projecting pin 89 that pivotally supports the root end of an arm 90 whose free end is swingable on an axis 91 that is parallel to the axes of the bearings 75 and platform hinge 81. The swingable free end of each arm 90 is connected to an upper end of an elongate flexible member such as link chain 92 whose other end is connected via a shackle to a bracket 87 affixed to and upstanding from a rear platform side frame member 84. An actuator arm 93 has a root end pivotally connected at actuator axis 94 to the rear platform side frame member 84 adjacent to the hinge 81 interconnecting the two platform sections while an intermediate portion of the link chain 92 is pivotally connected with a pin through a link at actuator axis 95 to a yoke comprising the outer end of the actuator arm 93. The actuator axes 94 and 95 are parallel to the platform hinge 81.

The geometry of this linkage mechanism is substantially that shown in FIG. 4 and effects co-rotation of the two platform sections 78 and 79 substantially in the manner depicted therein in solid and dotted outlines. FIG. 6 depicts an intermediate phase of the folding of the two platform sections 78 and 79 while the link chain 92 on each side remains in tension. As the forward platform section advances farther toward the fully erect position, a chain section 92-1 between the arm 90 and the actuator arm 93 and the other chain section 92-2 between the actuator arm 93 and bracket 87 will become slack. Accordingly, the linkage system is adapted on each side for maintaining both chain sections 92-1 and 92-2 in substantial parallelism with the corresponding platform side frame members 82 and 84.

Figure 7:
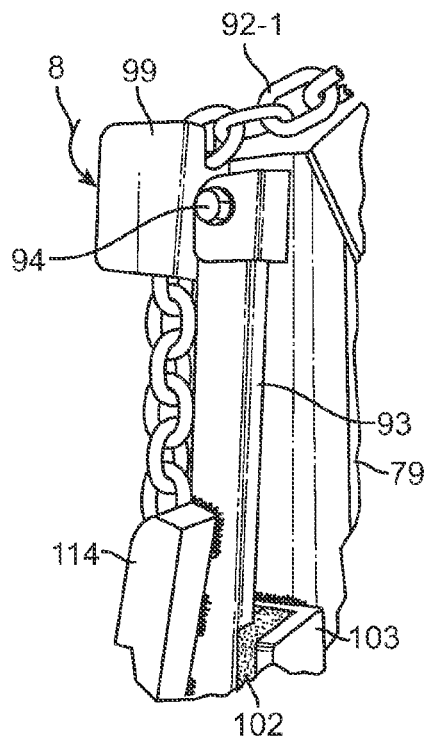
FIG. 7 is a partial perspective view of the area of pivotal interconnection of the two platform sections, particularly showing portions utilized in constraining the corresponding chain during folding and unfolding movement of the two platform sections, according to an embodiment of the invention.
Figure 8:
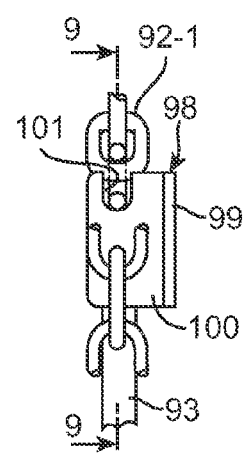
FIG. 8 is a partial elevational view taken in the direction of the arrow 8 of FIG. 7, according to an embodiment of the invention.
Figure 9:
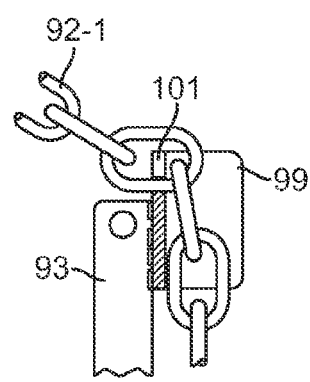
FIG. 9 is a partial sectional view taken on the line 9-9 of FIG. 8, according to an embodiment of the invention.

FIG. 7 is a partial perspective view of the area of pivotal interconnection of the two platform sections, particularly showing portions utilized in constraining the corresponding chain during folding and unfolding movement of the two platform sections, according to an embodiment of the invention. FIG. 8 is a partial elevational view taken in the direction of the arrow 8 of FIG. 7, according to an embodiment of the invention. FIG. 9 is a partial sectional view taken on the line 9-9 of FIG. 8, according to an embodiment of the invention. As shown, the root end portion of the actuator arm 93 has a generally L-shaped bracket 98 affixed thereto. The bracket 98 has an upstanding flange 99 oriented parallel to the actuator arm 93 for retaining the link chain 92 against sideward displacement outwardly of the platform sections. The bracket 98 also includes a base portion 100 formed on one edge with a notch 101 adapted to capture a link of the chain section 92-1 as the platform sections approach the fully closed condition. As the chain section 92-1 slackens upon continued closing of the platform sections, the actuator arm 93 is gravitationally biased into substantial parallelism with the rear platform section 79, coming to rest against a compressible pad 102 carried by a flange of an L-shaped bracket 103 affixed to the corresponding side frame member 84.

As is indicated by the two dotted outline positions in FIG. 4, folding and unfolding of the two platform sections 78 and 79 is performed when they are at a lower position than their fully raised condition shown in solid outline. In this connection, a means is provided for biasing the two platform sections slightly apart when in the partly lowered condition, while a camming means or the like is provided for wedging the two platforms together into substantial parallelism as they are raised into the fully elevated condition.

Figure 13:
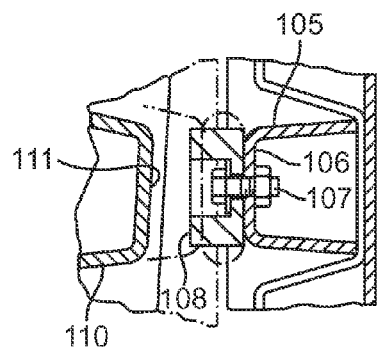
FIG. 13 is a partial sectional view of a bumper pad area of the main platform section shown in FIG. 12 and showing, in phantom outline, a fully compressed condition of the bumper pad upon complete closing of the outer platform section, according to an embodiment of the invention.

FIG. 13 is a partial sectional view of a bumper pad area of the main platform section shown in FIG. 12 and showing, in phantom outline, a fully compressed condition of the bumper pad upon complete closing of the outer platform section, according to an embodiment of the invention. Referring to FIGS. 12 and 13, a cup-like bracket 105 is seated and affixed, as by welding, on the flat root section 86-1 of one of the valleys of the corrugated metal sheet 86 of the main platform section 78. The bracket has a flat dome portion 106, preferably protruding slightly above the level of the crests of the corrugated sheet that centrally mounts a fastener means 107 having a head portion externally of the dome to secure a base portion of an annular cushion 108. The cushion 108 is made of an elastomeric material and the axial dimension of the cushion supporting structure is such that the annular face of the cushion 108 protrudes into the space occupied by the rear platform section 79 when it swings into parallelism with the forward platform section 78.

In somewhat similar fashion the rear platform section 79 and a root portion 86-1 of a transverse valley of its corrugated metal sheet 86 is fitted with a cup-like bracket 110 on a radius relative to the platform connection hinge 81 like that of the annular cushion 108. The bracket 110 is configured with a preferably flat dome section 111 for engagement with the annular surface of the annular cushion 108 when the two platform sections are swung together in the manner indicated by the directional arrow of FIG. 12. The bracket 110 has an axial dimension such that when the two platform sections are brought into parallelism, as indicated in phantom outline in FIG. 13, the annular cushion 108 is axially compressed so that when the two platform sections are released from the restraint holding them into parallelism, the annular cushion 108 expands to bias the rear platform section 79 away from the forward platform section 78.

Figure 11:
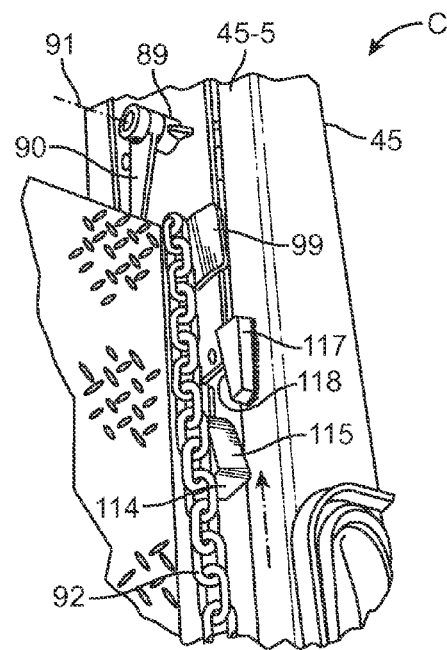
FIG. 11 is a partial perspective view similar to FIG. 10, but showing parts in their relative positions during lifting of the platform assembly into the fully raised condition of FIG. 10, according to an embodiment of the invention.

As shown in FIG. 4, a wedge block 114 is secured to the outside of the actuator arm/bar 93 of the rear platform section 79 at a location intermediate its opposite ends. The wedge block 114 extends above an edge of the actuator arm 93 to present an exposed flared surface 115 (FIG. 11).

Figure 10:
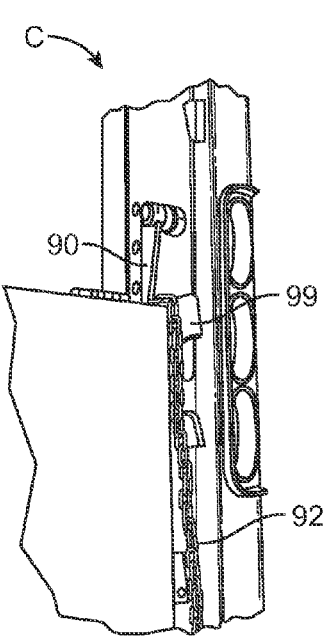
FIG. 10 is a partial perspective view of the curb side columnar assembly and corresponding side of the platform assembly, the latter being shown on a fully closed and raised condition, according to an embodiment of the invention.

FIG. 10 is a partial perspective view of the curb side columnar power assembly C and corresponding side of the platform assembly P, the latter being shown on a fully closed and raised condition, according to an embodiment of the invention. FIG. 11 is a partial perspective view similar to FIG. 10, but showing parts in their relative positions during lifting of the platform assembly into the fully raised condition of FIG. 10, according to an embodiment of the invention. As shown in FIG. 11, the flange 45-5 of the column 45 has a vertically disposed cam block 117 secured thereto, having a forward face 118 that inclines downwardly and rearwardly in interfering alignment with the profiled wedge block flared surface 115. Thus, when the two platform sections are lifted from the position of FIG. 11 into the fully elevated position shown in solid outline in FIGS. 10 and 4, the rear platform section 79 is wedged into parallelism with the forward platform section 78 to compress the annular cushion 108 of the forward platform section 78.

Figure 3:
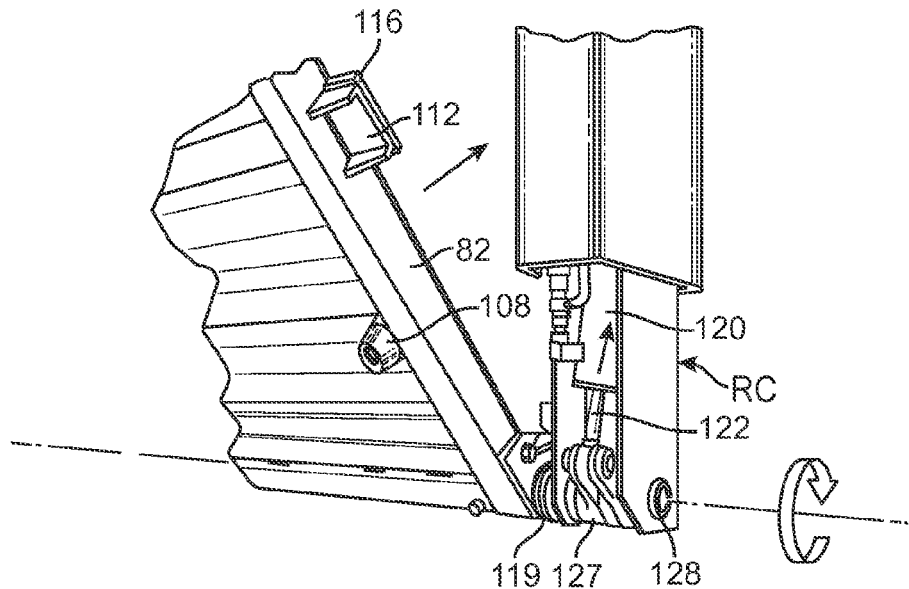
FIG. 3 is a partial perspective view of substantially the same area as depicted in FIG. 2, but with the parts in different relative positions, according to an embodiment of the invention.

As shown in FIG. 3, the forward platform section 78 on each of its side frame members 82 is fitted with a block 112 while each of the runner assemblies RS and RC is fitted on its inner face with a corresponding stop member 113. Each stop member 113 and the pair of blocks 112 are on the same radius relative to the platform hinge such that when the forward platform section 78 moves into the vertical position the stop member 113 engages an elastomeric pad 116 fitted on the block 112.

When the two platform sections have been folded together and raised and wedged together into the transit position, all of the pads 102, 108, and 116 are in a compressed state. Thus, when the folded platform sections are lowered to an extent that the wedge block 114 is released from contact with the cam block 117, the accumulated compressive forces are released by displacing the rear platform section 79 rearwardly relative to the forward platform section 78. This arrangement is adequate for partially opening the platform sections before actuation of the crank means 42 in most attitudes of the truck. However, a torsion spring 119 coaxially supported on the bearing 75 is primarily relied on for this purpose, particularly when the truck points downhill.

The powered crank means 42 (FIGS. 1-2) for effecting rotation or turning of the platform sections is mounted at the lower end of the curb side runner assembly RC. The crank means 42 comprising a preferably single acting fluid powered cylinder 120 having an upper butt end pivotally connected to the inside faces of the runner member 50 by a pin 121 (FIG. 15) fixedly projecting therebetween. The pin 121 is positioned adjacently beneath the runner support pin 51 and slightly closer to the front wall 50-3 of the runner 50 (FIG. 18). The cylinder 120 inclines downwardly rearwardly and has a piston rod 122 projecting axially therefrom to terminate in an eye 123 that is coaxially rotatably seated on a crank pin 124.

Figure 2:
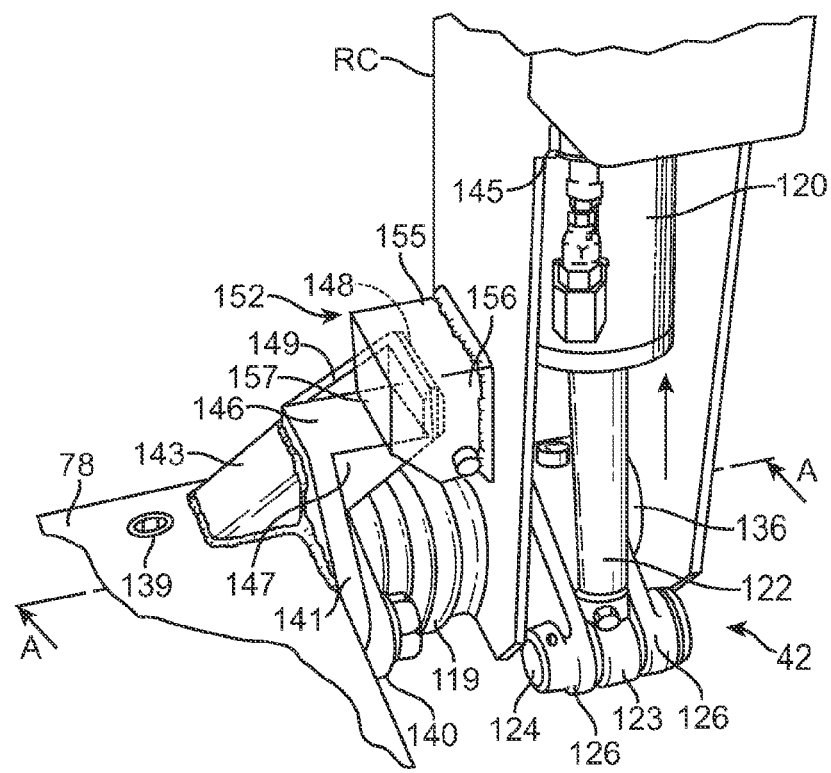
FIG. 2 is a fragmentary perspective view of the lower end portion of the curb side column assembly of FIG. 1 and the corresponding corner of the load platform, according to an embodiment of the invention.
Figure 2A:
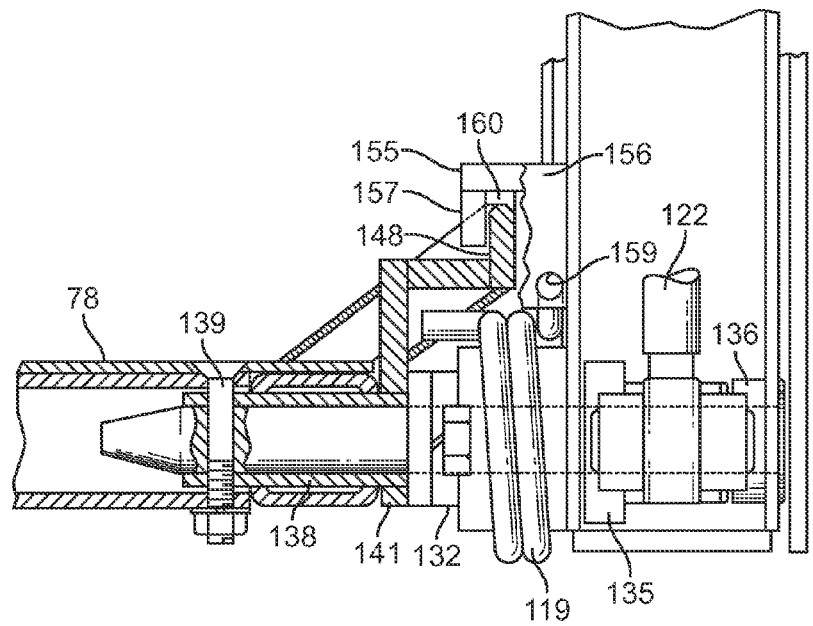
FIG. 2A is a view, partly in section, taken on the line A-A of FIG. 2, according to an embodiment of the invention.
Figure 2B:
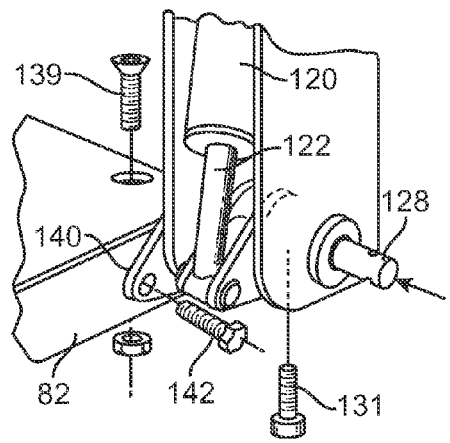
FIG. 2B is a partial exploded perspective view of the platform pivot hinge construction at one side of the platform, according to an embodiment of the invention.
Figure 2C:
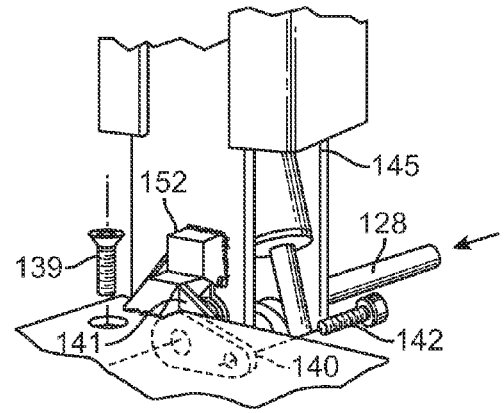
FIG. 2C is a partial perspective view of the general area shown in FIG. 2B, but from the opposite side, according to an embodiment of the invention.

FIG. 2A is a view, partly in section, taken on the line A-A of FIG. 2, according to an embodiment of the invention. FIG. 2B is a partial exploded perspective view of the platform pivot hinge construction at one side of the platform, according to an embodiment of the invention. FIG. 2C is a partial perspective view of the general area shown in FIG. 2B, but from the opposite side, according to an embodiment of the invention. Referring to FIGS. 2, 2A-2C, on opposite sides of the piston rod eye 123, opposite ends of the crank pin 124 are journalled in aligned holes of a companion pair of crank arms 126, which have an integral root crank hub 127 coaxially mounted on a platform pivot pin 128. The crank hub 127 is keyed to the platform pivot pin 128 for co-rotation by a diametrically oriented bolt 131. Inwardly of the crank hub 127 the platform pivot pin 128 coaxially mounts a tubular member 132. A concentric annular spacer 135 bears against the inside face of crank hub 127. The tubular member 132 projects inwardly through the bearing 75 mounted on the inside face of the runner member 50 at its lower end. Coaxially with the bearing 75, the outer wall of the runner member 50 mounts a bearing 136 that receives the outer end of the platform pivot pin 128.

The inner end of the platform pivot pin 128 is keyed to the platform by a fastener means 139 through a sleeve 138 fixed in the adjacent end of the forward edge frame member 83 of the forward platform section 78. The inner end of the tubular member 132 is integrally formed with a radially extending tear drop crank arm 140 that is oriented in flush engagement with a plate 141 fixed on the corresponding platform side-frame member 82. The outer end of the crank arm 140 receives a bolt 142 that is anchored within the platform side frame member 82. Accordingly, the forward platform section 78 is keyed to the piston rod 122 of the power cylinder 120 such that they undergo movement simultaneously.

In order to provide clearance for actuation of the crank means 42, the rear wall 50-4 (FIG. 18) and portions of the opposite side walls 50-1 and 50-2 of the curb side runner member 50 are cut away to provide a relief 145, in combination with the open lower end of the runner member 50. The pivotal platform connection of the runner assembly RS of the street side columnar power assembly S is essentially the same as that of the runner assembly RC of the curb side columnar power assembly C, except that, as the former is not equipped with another platform operating cylinder, it has no similar relief 145, nor the parts associated with the cylinder 120 such as the crank arms 126 and crank hub 127.

As will appear, the platform power cylinders 49 of the columnar power assemblies S and C are operated synchronously in order to maintain a horizontal attitude of the platform P during raising and lowering thereof. However, to ensure a substantially level attitude of the platform from side-to-side, notwithstanding off-center loads or any lack of synchronicity between the pair of cylinders, coating means are provided at each of the forward corners of the forward platform section 78 such that any lagging of one runner assembly behind the other is compensated for.

More specifically, as shown in FIG. 2, the corner plate 141 at each side of the forward platform section 78 projects above the platform skin and has a channel gusset 143 welded between its inside face and the platform sheet metal skin 85. At its forward upper edge, the plate 141 has a laterally outwardly directed flange 146 that is substantially parallel to the platform skin and whose underside is reinforced by another gusset 147 welded between the underside of the flange 146 and the outer face of the plate 141. At its free edge, the flange 146 has an integral upstanding flange 148 reinforced by a gusset plate 149 interposed between forward edges of the flange 146 and flange 148.

Each of the runner assemblies is provided at the lower end of its inner face with a box-like structure 152 into and out of which the flange structure of the plate 141 is rotated by turning of the forward platform section between vertical and horizontal positions. Thus, at a position just above the bearing 75, each runner member 50 is provided with a horizontally inwardly projecting fixed plate 155 that is enclosed on its underside by vertically depending rear plate 156 and an inside plate 157, the parts being welded to each other and to the corresponding runner. The rear plate 156 may be formed with a hole 159 to anchor an end of torsion spring 119. Internally, the box-like structure 152 is rigidly fitted with a plate or plates to define an internal slot 160 (FIG. 2A) that is open at the bottom and at the forward side of the block structure 152.

As indicated in FIG. 2A, the internal slot 160 is oriented such that rotation of the forward platform section 78 rotates the flange 148 carried by the platform into and out of the internal slot 160, the flange having tapered leading edges. Preferably, there is only a small clearance between opposite sides of the flange 148 and the internal walls of the box-like structure 152 defining the internal slot 160 so that the two parts are in effect locked against lateral displacement when mutually engaged. The engaged surfaces, being radially offset from the axis of the pair of platform pivot pins 128, provide mechanical advantage to stabilize the forward platform section 78 in a horizontal attitude from side-to-side.

The curb side runner assembly C has a length of hydraulic tubing 164 extending vertically through the clearance passage 56 within the rear guide track 53 alongside an electrical harness 165. A clip assembly 166 is interiorly mounted on the rear wall 45-3 of the column 45 at its lower end to support an assembly of fittings 167 and 168 providing fluid communication between the lower end of the hydraulic tubing 164 and the lower end of a length of flexible hose 169 (FIG. 20). The clip assembly 166 also supports and restrains a portion of the harness 165 which passes therethrough to turn upwardly to be trained alongside the flexible hose 169. The flexible hose 169 and the companion portion of the harness 165 are trained upwardly and reversely bent through a bight 174 with the hose terminating at an elbow 170 providing fluid communication to the interior of the cylinder to deliver fluid under pressure to the underside of the piston therein (FIG. 15).

In order to control the flexure of the hose 169 and the companion length of harness 165, during reciprocation of the runner assembly, they are wrapped by a helically coiled wire 173 and guided in an opposing pair of channels formed in the lower end of the runner member 50 and column 45. More specifically, referring to FIGS. 18 through 20, portions of the runner walls 50-1 and 50-4 are cut away at an intermediate portion of their common corner to fixedly mount a vertical length of channel 175 (FIG. 19) whose open side faces the column 45. A similar channel is formed in the column 45 by removal of an edge portion of the rear guide track 53 in its lower end portion adjacent to the flange 45-5 and by fixedly mounting an elongate strip 176 extending between the inside face rear wall 45-3 and the cut-away edge of the rear guide track 53. In order to anchor one end of the helical wire 173, a fastener means 177 is connected between the column flange 45-5 and the strip 176 adjacent their lower ends to capture adjacent end coils of the wire 173.

The vertical extent of the channel 175 of the runner is so oriented relative to the vertical extent of the opposing channel formed by the strip 176 on the column 45 that when the runner is in the raised position an upper end portion of the column channel confronts a lower end portion of the channel 175 of the runner. A portion of the electrical harness 165 extends upwardly through an open upper end of the channel 175 and is trained interiorly through the runner to terminate at a switch 178 at the upper end of the runner operable externally of the runner as by an operator standing on the platform or the bed of the truck to raise or lower the platform. As will now be evident, the composite structure comprising the companion portions of the flexible hose 169 and harness 165 encased in the wire coil 173 flex through the running bight 174 during reciprocation of the runner while the opposite leg portions of the composite structure are protectively shielded within their respective channels.

Figures 23, 24, 25:
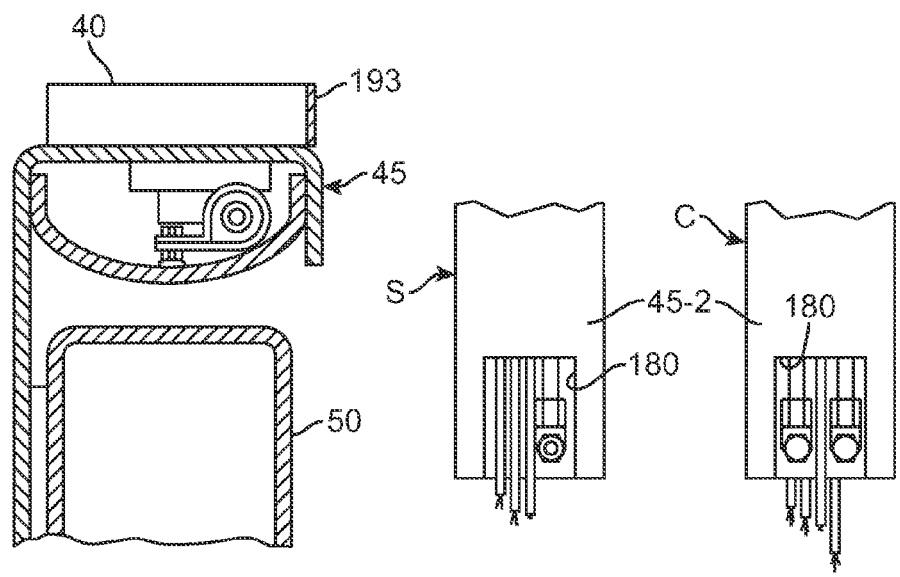
FIG. 23 is a partial sectional view taken on the line 23-23 of FIG. 14, according to an embodiment of the invention.
FIG. 24 is a partial elevational view of the lower end portion of the forward face of a column assembly, according to an embodiment of the invention.
FIG. 25 is a partial elevational view of the lower end of the forward side of a column assembly, according to an embodiment of the invention.

FIG. 24 is a partial elevational view of the lower end portion of the forward face of a column assembly (such as the street side column assembly S), according to an embodiment of the invention. FIG. 25 is a partial elevational view of the lower end of the forward side a column assembly (such as the street side column assembly C), according to an embodiment of the invention. Referring to FIGS. 24 and 25, the forward wall 45-2 of each of the columns 45 is formed at its lower end with a window or aperture 180. Access is thus provided to the interior of the clearance passage 54 under the corresponding front guide track 52 for the electrical harnesses and fluid conduits appropriate for the corresponding column assembly C or S. The accessible ends of the electrical harnesses accessible at the aperture 180 are fitted with plugs or receptacles for connection to and disconnection from an external source of electrical power. Similarly, the ends of the hydraulic conduits accessible through the aperture 180 are fitted with couplings for connection to and disconnection from an external source of pressurized hydraulic fluid.

As is shown in FIGS. 18 and 22, the corresponding conduits and harnesses are trained vertically through the clearance passage 54. In the case of both column assemblies the fluid power circuit includes a length of tubing 182 (FIG. 15) extending the length of the corresponding cylinder 49 having valve controlled fluid communication with the lower end of the corresponding cylinder 49.

Figure 21:
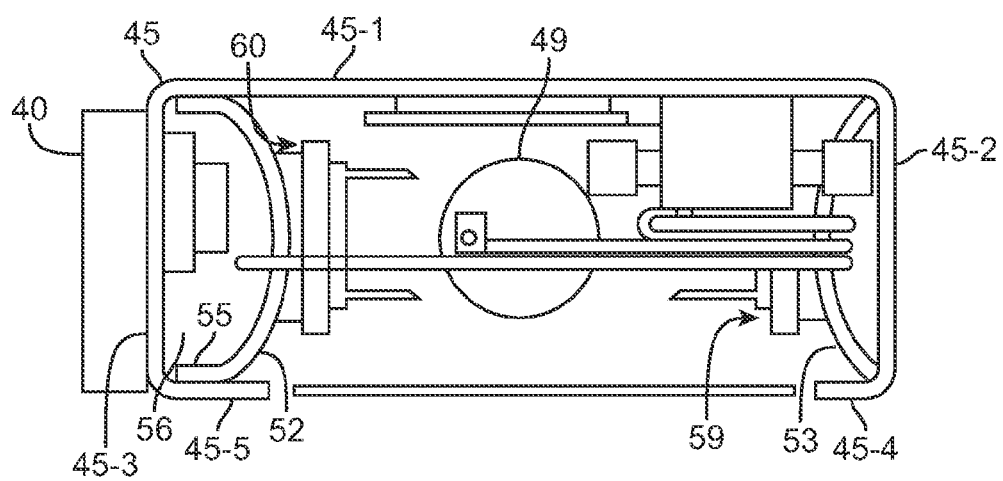
FIG. 21 is a top view taken in the direction 21 of FIG. 14, the cover of the assembly having been removed, according to an embodiment of the invention.

FIG. 14 is a rear elevational view of a columnar assembly, portions being cut away to show interior details of construction, according to an embodiment of the invention. FIG. 21 is a top view taken in the direction 21 of FIG. 14, the cover of the assembly having been removed, according to an embodiment of the invention. Referring to FIGS. 18 and 21, one electrical harness is trained through the upper end of the corresponding column and thence downwardly through the clearance passage 56 under the rear guide track 53 for connection to the housings of a vertically spaced apart series of lamps 190, 191 and 192 (FIG. 1) internally mounted on and protected by the rear wall 45-3 of the corresponding channel 45. The lamp lenses protrude slightly rearwardly beyond the external surface of the channel 45 but are protected against breakage by a vertically extending flange 193 (FIG. 23), having arcuate opposite end portions, externally affixed to the rear wall 45-3 of the channel 45, protruding rearward a dimension slightly greater than the lenses. Preferably, the vertical array of lamps 190-192 is positioned above the level of the truck bed 41 (FIG. 1). The lamps 190-192 may comprise stop lights, warning lights and turn signals and, as is evident, because of their relationship relative to the platform assembly P are not subject to being blanked out in any phase of operation of the liftgate.

Self-Adjusting Load Bearing Pads and Fixed Angle Clearance Pads

As shown in FIGS. 16 and 22, the axis of pivotal connection 51 between the piston rod 57 and the runner member 50 is laterally offset relative to the longitudinal axis of the runner to be more adjacent to the forward wall 50-3 of the runner member 50. As shown in FIG. 15, above the runner support pin 51, an upper portion of the runner member 50 is fitted at the front and rear walls thereof with vertically spaced apart self-adjusting load bearing, sliding contact pads 59 and 60 (load pads), having sliding contact with surfaces of the parallel tracks 53 and 52 (FIG. 14G), respectively.

As can be seen from an inspection of FIGS. 15 and 18, the longitudinal axis of the runner member 50 is slightly canted relative to the vertical axis of the power cylinder 49 by virtue of the location of the runner support pin 51 such that the runner member 50 inclines slightly rearwardly and downwardly, which canted attitude is maintained during reciprocation of the runner member 50 by the spaced self-adjusting sliding load pads 59 and 60 (FIG. 21). In heavier duty applications, each load pad may be replaced by multiple load pads.

Figure 26:
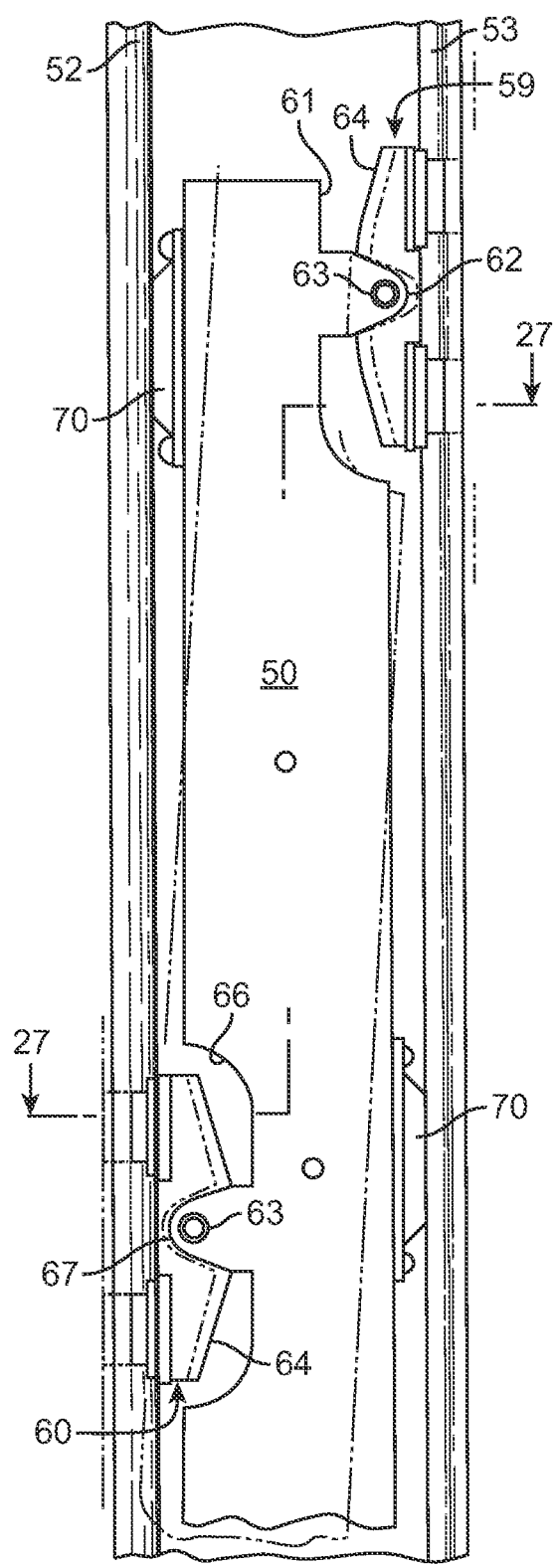
FIG. 26 is a schematic vertical sectional view illustrating interaction of a runner assembly relative to its corresponding support column, the parts being illustrated in phantom outline in an exaggerated condition under conditions of displacement due to stress, according to an embodiment of the invention.

As shown in FIGS. 18 and 22, at the upper end of the runner member 50 portions of the rear face 50-4 and opposite side walls 50-1 and 50-2 are cut away to provide relief (clearance) for a mounting means for the upper load pad 59. FIG. 26 is a schematic vertical sectional view illustrating interaction of a runner assembly relative to its corresponding support column, the parts being illustrated in phantom outline in an exaggerated condition under conditions of displacement due to stress, according to an embodiment of the invention. In the example shown in FIG. 26, said relief may take the form of the profile 61 which leaves a pair of rearwardly projecting ears 62 formed in the opposite side walls 50-1 and 50-2 of the runner member 50. The confronting pair of ears 62 are formed with coaxial holes for the reception of opposite ends of a pin 63, opposite ends of which pivotally support brackets 64 that mount/support contact pads 64C. Each pin 63 passes coaxially through the hub of the corresponding bracket 64 to rotatably support the same. Similarly, for mounting the lower lad pad 60, the forward wall 50-3 and opposite side walls 50-1 and 50-2 of the runner member 50 are relieved to define the profile 66 and spaced ears 67 also seen in FIG. 26. As before, the ears 67 support opposite ends of another pin 63 whose opposite ends, in turn, pivotally support a bracket 64 mounting a respective contact pad 64C. In one example, each contact pad 64C has a rectilinear footprint about 2 inches by 2 inches or 5.08 centimeters by 5.08 centimeters.

Figure 14A:
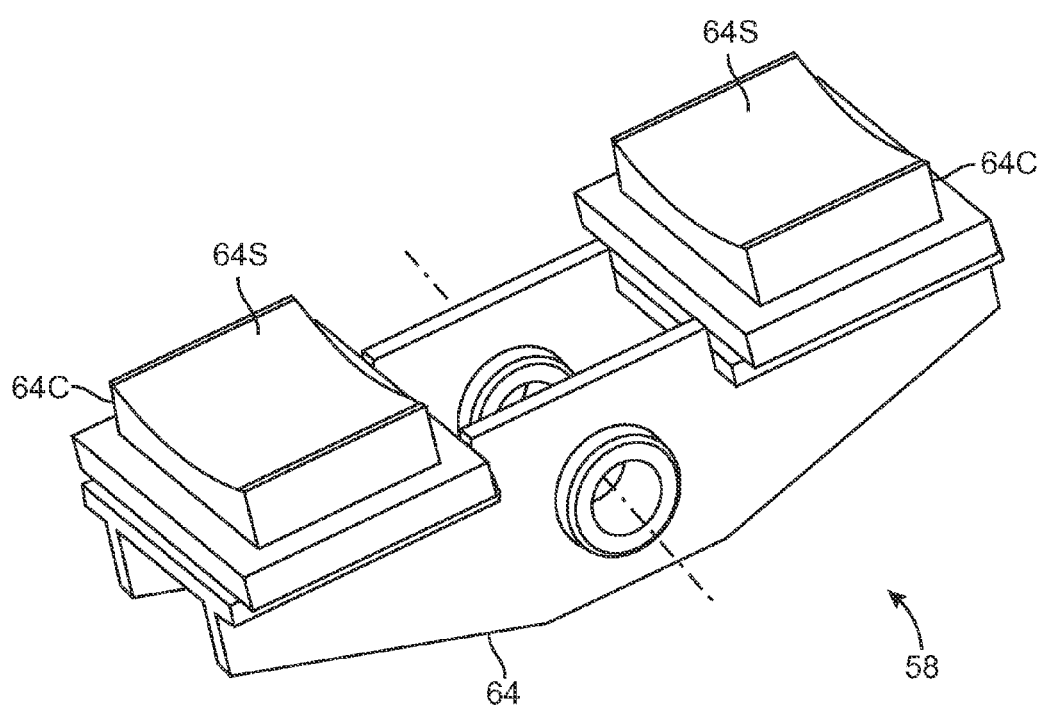
FIG. 14A shows a perspective view of a loading bearing pad for a columnar assembly, according to an embodiment of the invention.
Figure 14B:
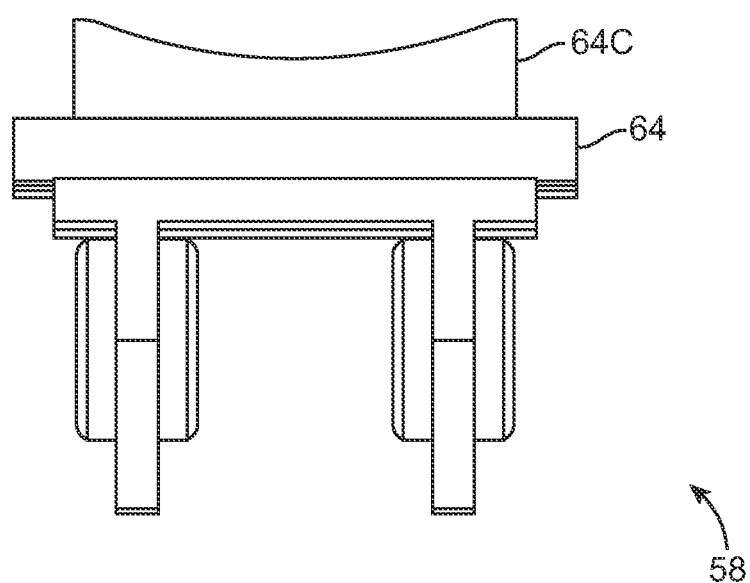
FIG. 14B shows an end view of a load bearing pad for a columnar assembly, according to an embodiment of the invention.
Figure 14C:
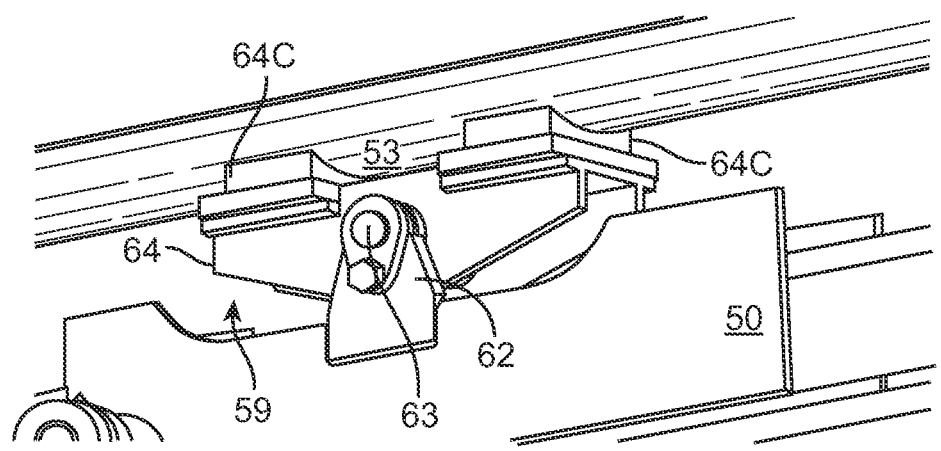
FIG. 14C shows a perspective view of a mounted loading bearing pad for a columnar assembly, according to an embodiment of the invention.
Figure 14D:
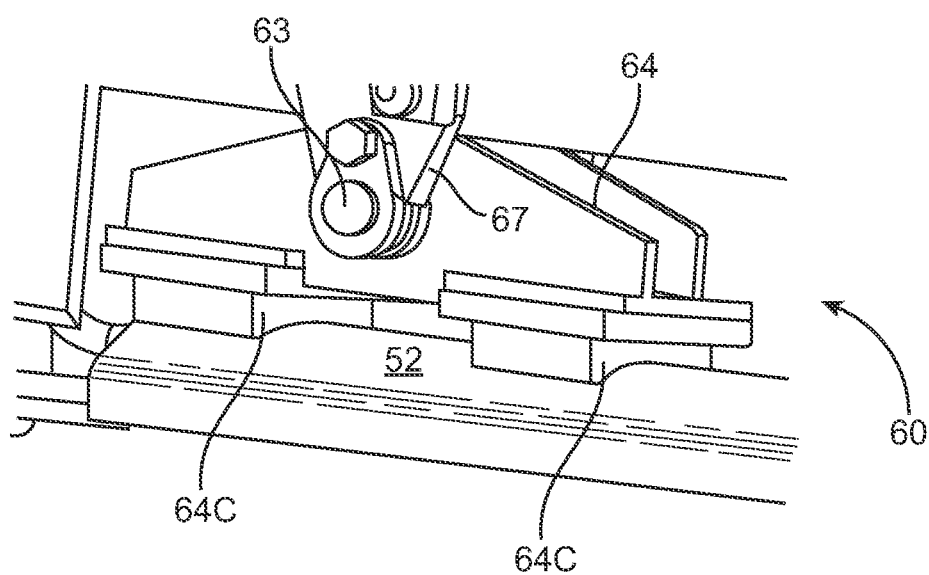
FIG. 14D shows a perspective view of another mounted loading bearing pad for a columnar assembly, according to an embodiment of the invention.

FIG. 14A shows a perspective view of a load pad 58 comprising tandem contact pads 64C supported by a bracket 64, according to an embodiment of the invention. FIG. 14B shows an end view of a load pad 58. Each of the contact pads 64C has a periphery of concave configuration formed on a radius matingly complementary to that of the surfaces of the guide tracks 52 and 53. FIG. 14C shows a perspective view of a load pad 59 resting against rear guide track 53, wherein the load pad 59 is an example of the load pad 58. Further, FIG. 14D shows a perspective view of the load pad 60 resting against front guide track 52, wherein the load pad 60 is an example of the load pad 58.

The contact pads 64C and guide tracks 52, 53, have the centers of their respective radii within a common vertical plane substantially bisecting the contact pads 64C and the track surfaces. Load pads 59 and 60 are thus matingly engaged by the track surfaces throughout their axial width. It should also be observed that each of the load pads 59 and 60 is shorter in axial length than the pins 63 and the space between confronting surfaces of the corresponding pair of said ears 62, 67 (FIGS. 14C, 26). As a result, each of the load pads 59, 60 is automatically axially displaceable with respect to the pin 63 on which it is supported relative to the corresponding track surfaces for maintaining substantial uniform contact therebetween substantially throughout the axial width of said contact pad 64C (e.g., upon deflection of a track surface or wear of the load pads and/or track surfaces).

The contact pads 64C have a low coefficient of friction and are adapted to cushion the runner member 50 during reciprocation and against vibration, and may be made of a hard plastic material or a high density polymer although a metallic material can also be used.

Figure 14E:
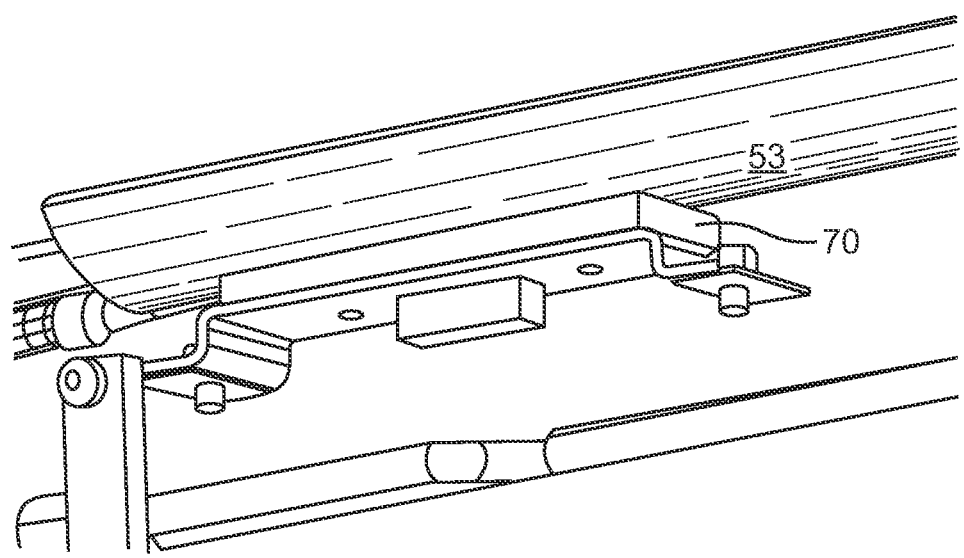
FIG. 14E shows a perspective view of a mounted clearance pad for a columnar assembly, according to an embodiment of the invention.
Figure 14F:
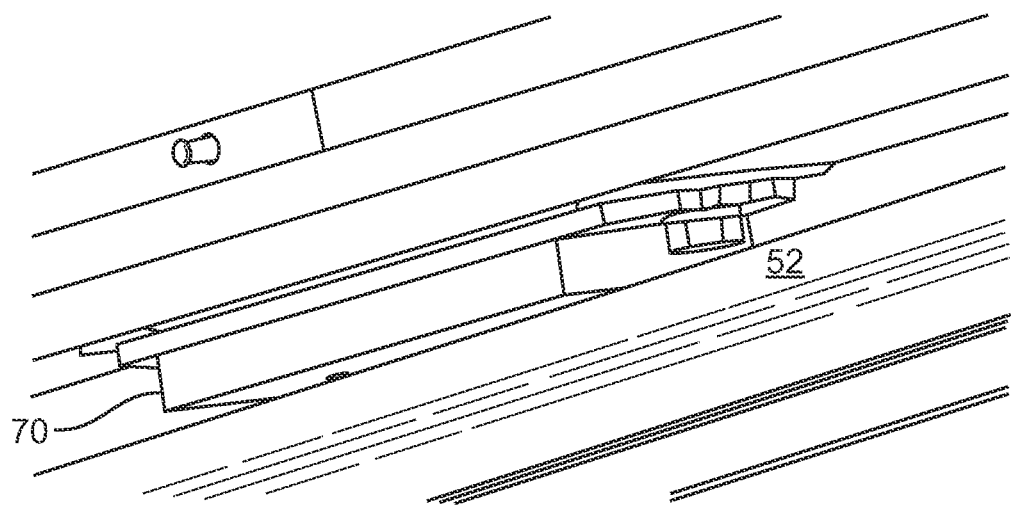
FIG. 14F shows a perspective view of another mounted clearance pad for a columnar assembly, according to an embodiment of the invention.
Figure 14G:
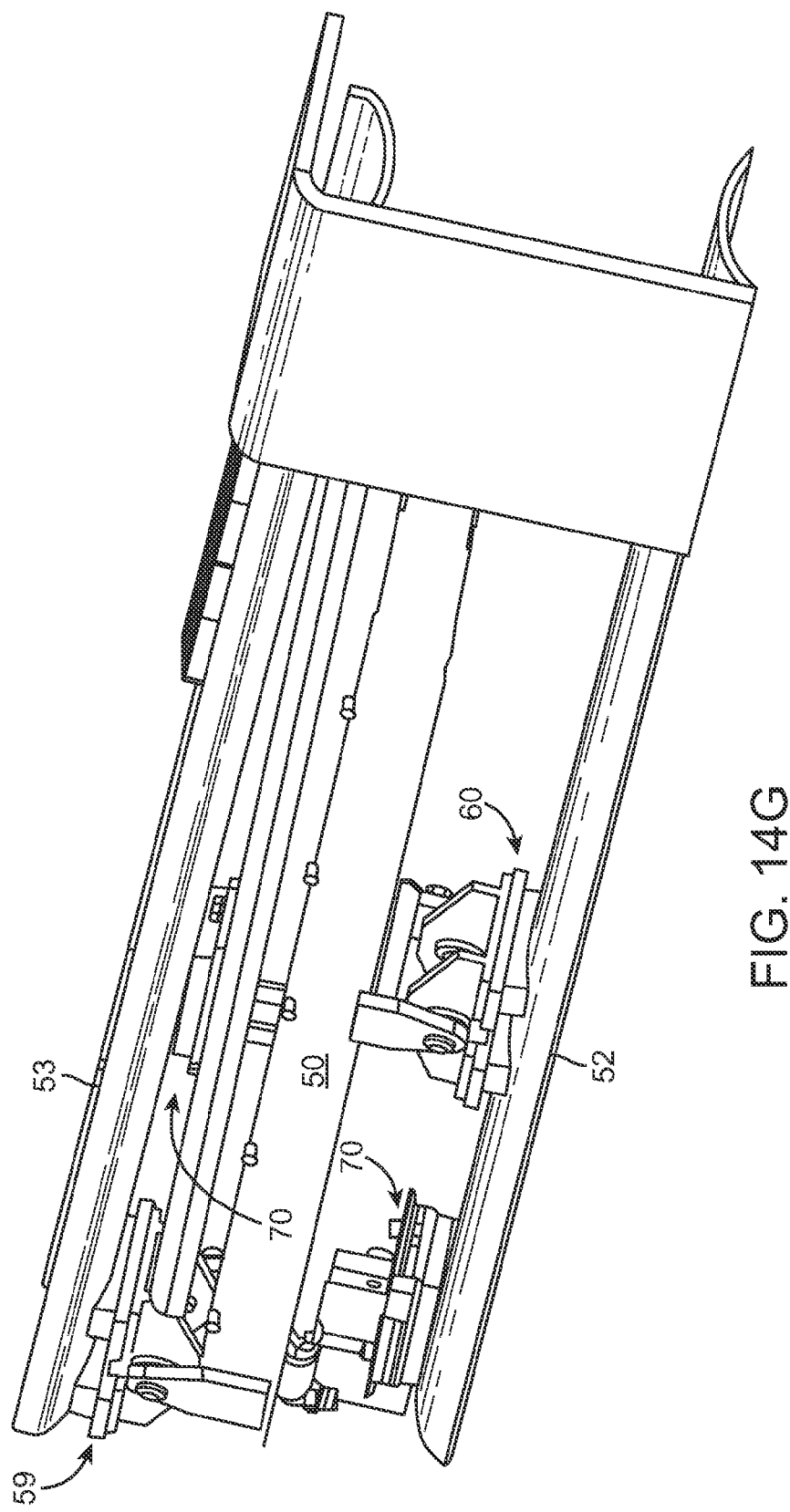
FIG. 14G shows a perspective view of mounted load bearing and clearance pads for a columnar assembly, according to an embodiment of the invention.
Figure 29:
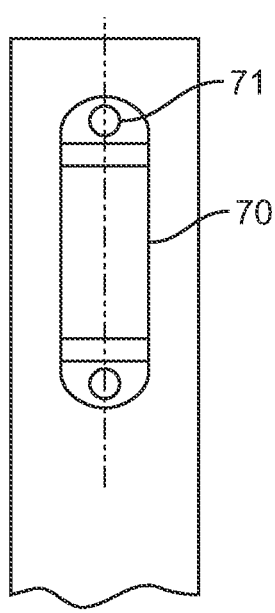
FIGS. 29 and 30 show partial elevational views of opposite faces of a runner showing the mounting of slider pads thereon, according to an embodiment of the invention.
Figure 30:
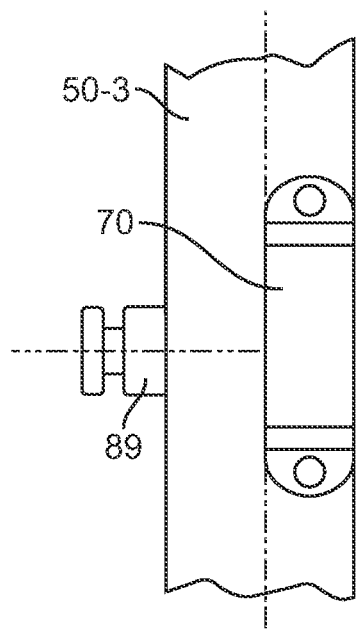

FIG. 14G shows a perspective view of mounted load bearing (contact) pads 59, 60 and clearance pads 70, for the runner member 50, according to an embodiment of the invention. Specifically, FIG. 14G shows a perspective view of an example assembly with the load pads 59, 60 from FIG. 14A, and essentially rectangular and uniform thickness clearance pads 70 from FIGS. 14E-F, mounted in relation to the runner member 50 and the guide tracks 52, 53, according to another embodiment of the invention. FIGS. 29 and 30 show partial elevational views of opposite faces of the runner member 50 showing the mounting of clearance pads (slider pads) 70 thereon, according to an embodiment of the invention.

Specifically, the front face 50-3 of the runner member 50, at a location opposite to the area of the upper load pad 59 mounted on the rear face 50-4, is fitted with a clearance pad 70 of a thickness to slidably engage the confronting front guide track 52. As indicated in FIG. 30, the clearance pad 70 may be offset from the midline of the runner and has beveled upper and lower edges. FIG. 14E shows a perspective view of a mounted clearance pad 70 for a columnar assembly, according to an embodiment of the invention.

Similarly, the rear face 50-4 of the runner member 50, in an area opposite the general area of the lower load pad 60, is fitted with a similar clearance pad 70, the pads being held in place by appropriate fastening means 71. FIG. 14F shows a perspective view of another embodiment of the clearance pad 70. The clearance pads 70 are preferably made of a hard plastic material, having a low coefficient of friction and are adapted to cushion the corresponding runner during its reciprocation and against vibration.

In one embodiment, the inside face of each runner member 50 is partially covered by a rectangular cover sheet 74 (FIGS. 1, 17) having a slight clearance between its opposite vertical edges and the inside flanges 45-4 and 45-5 of the corresponding column 45. In vertical extent, the cover sheet 74 extends from about the upper end of the corresponding runner member 50 downwardly to at least cover the lower load pad 60.

Figure 17:
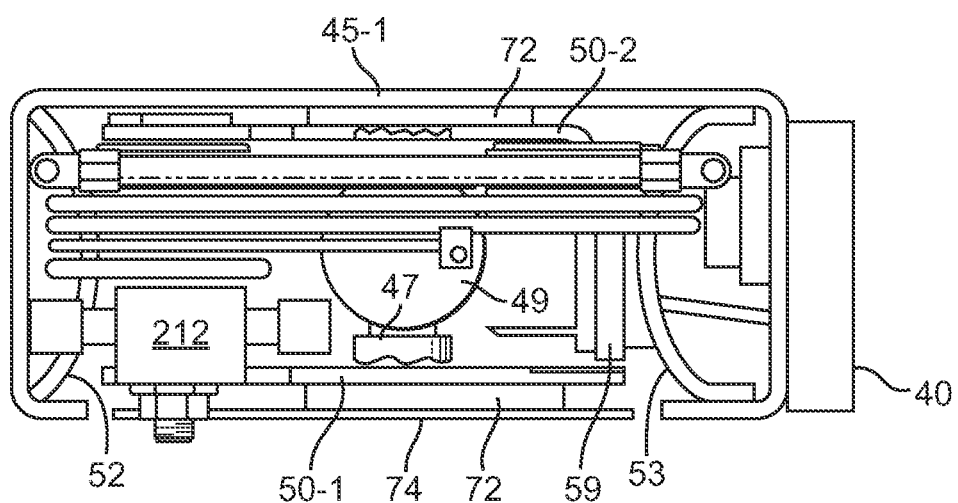
FIG. 17 is a top view taken on the direction 17-17 of FIG. 15, the top cover of the assembly having been removed, according to an embodiment of the invention.

In one embodiment, the side face 50-2 of the runner member 50 is externally fitted over a major portion of its vertical extent with a wide pad 72 of a thickness to slidably engage the inside face of the confronting web section 45-1 of the corresponding column 45 (FIGS. 17, 18). In one embodiment, the side face 50-1 of the runner member 50 is externally fitted over a major portion of its vertical extent with a wide pad 72 of a thickness to slidably engage the inside face of the cover sheet 74 of the column 45. The wide pads 72 are preferably made of a hard plastic material, having a low coefficient of friction and are adapted to cushion the corresponding runner during its reciprocation and against vibration.

According to an embodiment of the invention, the geometry of the columnar power assemblies C and S automatically compensates for wear occurring in the load pads 59 and 60. Also, the geometry of the load pads 59 and 60 and guide tracks 53 and 52 maintain their mutual contact irrespective of load pad wear and deflection of the column walls supporting the guide tracks 53 and 52.

More particularly, as a result of the heretofore described alignment of the cylinder butt end cylinder support pin 47 (FIG. 17), runner support pin 51 (FIG. 18), and platform bearings 75 (FIG. 15) and the resulting slightly canted attitude of the runner member 50 within the column 45 (FIGS. 18, 26), loads on the platform P are transmitted to the lower load pad 60 (FIG. 15) to react against the front guide track 52, and to react the upper load pad 59 against the rear track 53 through the upper load pad 59. Accordingly, as wear occurs on the concave surfaces 64S of the load pads 59 and 60, the runner member 50, by virtue of its support pin 51 to the piston rod of the cylinder 49 (FIGS. 14, 15, 41), at all times biases load pads 59 and 60 into uniform contact with their respective guide tracks 53, 52, regardless of reduction in load pad thickness (e.g., diameter).

In this connection, the mounting of each load pad 59 and 60, pivotally mounted via pin 63 (FIGS. 14C, 14D), uniformly distributes the load from the runner member 50 on each load pad 59, 60. As wear occurs on the load pads 59, 60, the runner member 50 moves towards parallelism of its longitudinal axis with the vertical axis of the corresponding column 45. Excessive wear of the load pads may be indicated by the runner 50 coming into a reversely canted attitude such that it slopes downwardly and forwardly of the column 45, thereupon signaling an occasion for replacement of the load pads 59, 60.

Figure 27:
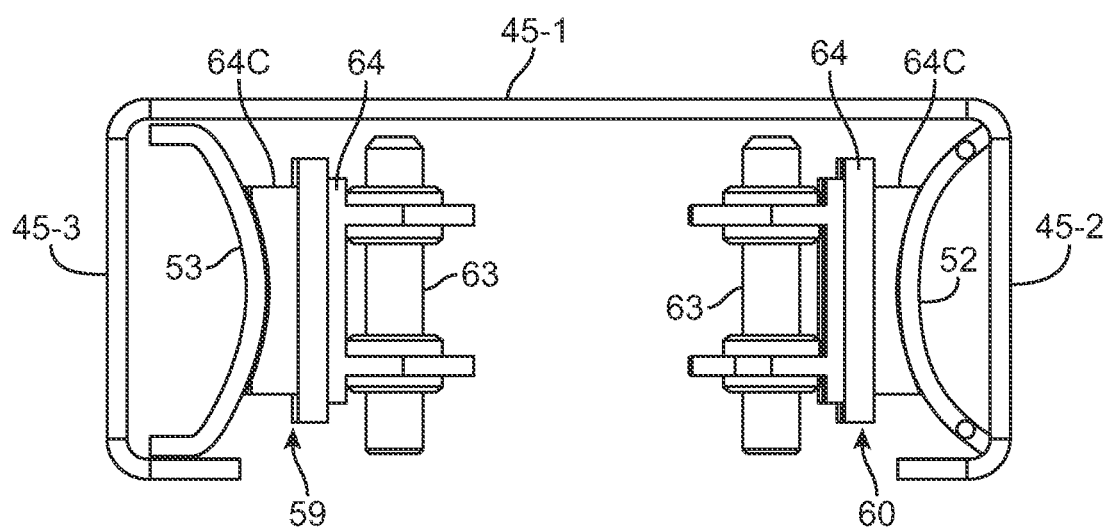
FIG. 27 is a staggered section taken on the line 27-27 of FIG. 26 showing the relative relationship of the parts in a normal condition, according to an embodiment of the invention.
Figure 28:
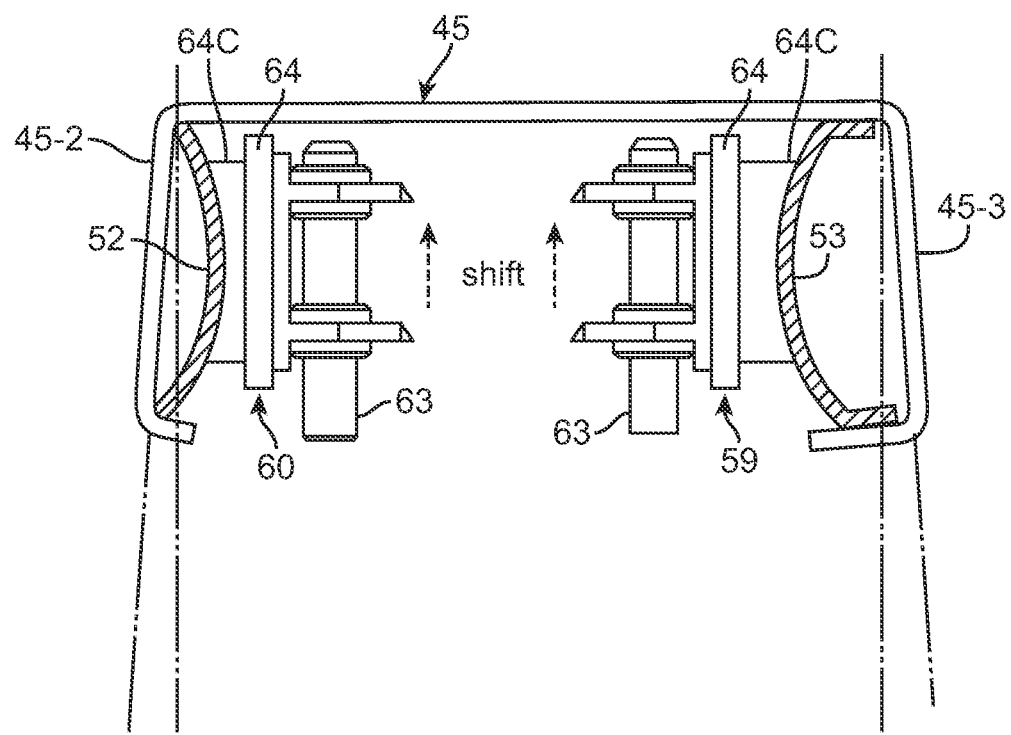
FIG. 28 is a view similar to FIG. 27, but showing the parts in the exaggerated stress condition shown in phantom outline in FIG. 26, according to an embodiment of the invention.

FIG. 26 is a schematic vertical sectional view illustrating interaction of the runner assembly 50 relative to its corresponding support column 45, the parts being illustrated in phantom outline in an exaggerated condition under conditions of displacement due to stress, according to an embodiment of the invention. FIG. 27 is a staggered section taken on the line 27-27 of FIG. 26 showing the relative relationship of the parts in a normal condition, according to an embodiment of the invention. FIG. 28 is a view similar to FIG. 27, but showing the parts in the exaggerated stress condition shown in phantom outline in FIG. 26, according to an embodiment of the invention.

Specifically, FIG. 26 shows in dotted outline a greatly exaggerated depiction of the deflection of the opposite column walls mounting the guide tracks 52 and 53, which is depicted in solid outline in FIG. 28. Notwithstanding such deflection, load pads 59 and 60 are mounted on the pins 63 to be shifted axially therealong so that each load pad 59 and 60 maintains contact between its concave surfaces 64S and the convex surface of the corresponding track uniformly from one end to the other.

Referring to FIG. 27, it will be seen that there is an appreciable clearance between each end of the load pads 59 and 60 and the inside faces of the support environment. Thus, as shown in FIG. 28, upon any appreciable deflection of the column walls 45-2 or 45-3 relative to the web section 45-1 of the column 45, each load pad 59 or 60 automatically shifts axially of its supporting pin 63 (indicated by dashed arrows) to maintain uniform contact from one side to the other with a convex surface of the corresponding guide track 53, 52. This automatic self-adjusting, including automatic self-centering, of each of the load pad 59, 60 with respect to corresponding guide tracks 53, 52, respectively, occurs regardless of wear on the load pads 59, 60 and distortion of the supporting column 45, and is maintained because as described, runner member 50 is mounted in a way to alter its canted attitude.

According to an embodiment of the invention, two or more contact pads maybe deployed at each location on the runner member 50. According to an embodiment of the invention, the surfaces of the contact pads may have features (not shown) such as dimples/grooves on them to reduce friction and/or greasing and/or cleaning. Such features may also reduce coefficient of friction against track surfaces and reduce harmonic vibrations. For example the pad surfaces may include V-shaped grooves, or holes to vary the coefficient of friction against the surfaces of the tracks.

Figure 43:
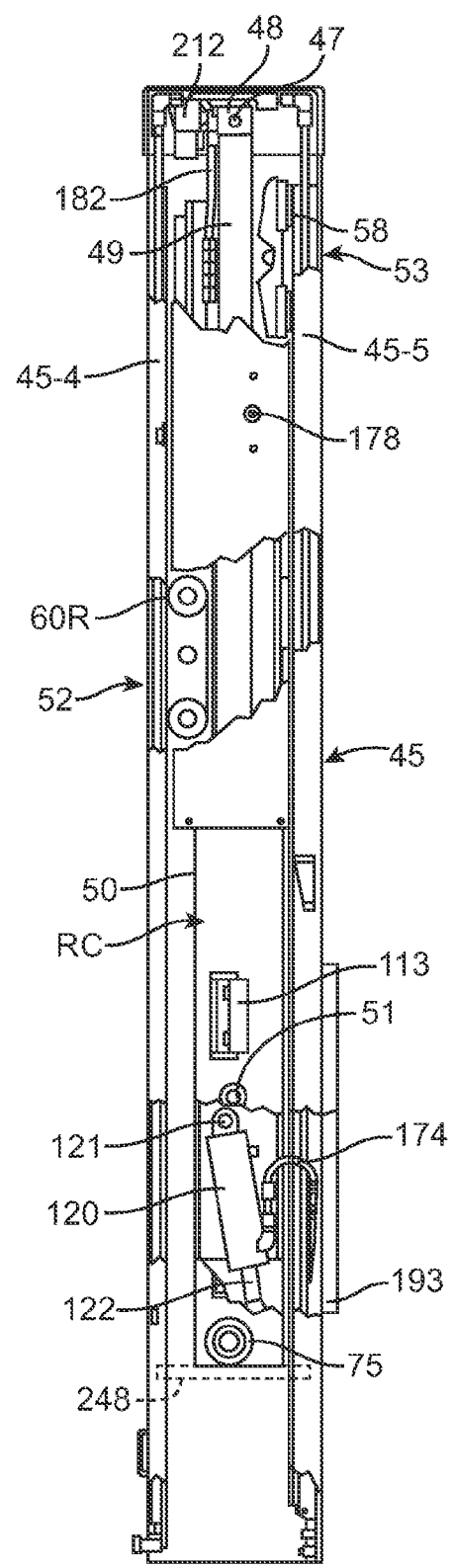
FIG. 43 is an elevational view of the inside of a columnar assembly similar to FIG. 15, but showing a combination of contact pads and rollers on a runner assembly, according to an embodiment of the invention.

According to an embodiment of the invention, a combination of load pads 58 and rollers 60R on a runner member 50, maybe used as shown by example in FIG. 43 (an example of such rollers 60R is described in U.S. Pat. No. 5,513,943, incorporated herein by reference).

Figure 44:
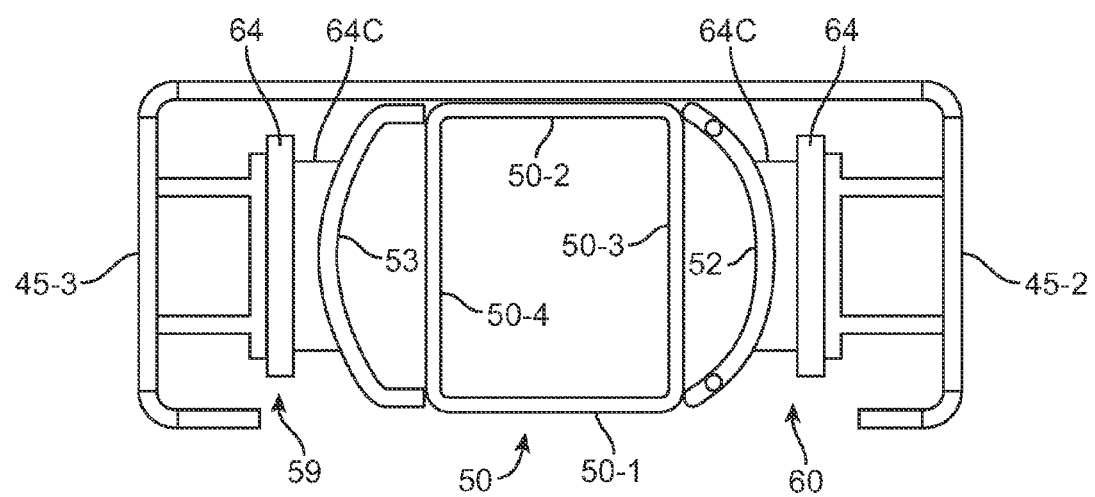
FIG. 44 is a sectional view similar to FIGS. 21 and 22 wherein guide surfaces are disposed on runner and the sliding contact members are disposed on the inner walls of the column, according to an embodiment of the invention.

As shown in FIG. 44, according to an embodiment of the invention, the location of the load pad 59 and the corresponding guide track 53 may be switched, such that the load pad 59 may be located on the inner surface of the rear wall 45-3 of the column 45, and the guide track 53 may be located on the rear face 50-4 of the runner member 50. Similarly, the location of the load pad 60 and the corresponding track 52 may be switched, such that the load pad 60 may be located on the inner surface of the front wall 45-2 of the column 45, and the guide track 52 may be located on the front face 50-3 of the runner member 50. As such, load pads 59, 60 may be located on the inner walls of the each column 45 and the guide tracks 52, 53 may be located on the runner member 50. The tracks 52 and 53 may be components or walls of the runner member 50. Further, clearance pads 70 may be located on the inner walls of the column 45 instead of on the runner member 50. In a similar fashion, when the guide tracks 52, 53 are located on the runner member 50, the clearance members 258, 261 may be positioned on the inner walls of the column 45, and the contact member 259, 260 may be positioned on the inner walls of the column 45.

Fixed Angle Load Bearing Pads and Adjustable Clearance Pads

Figure 31:
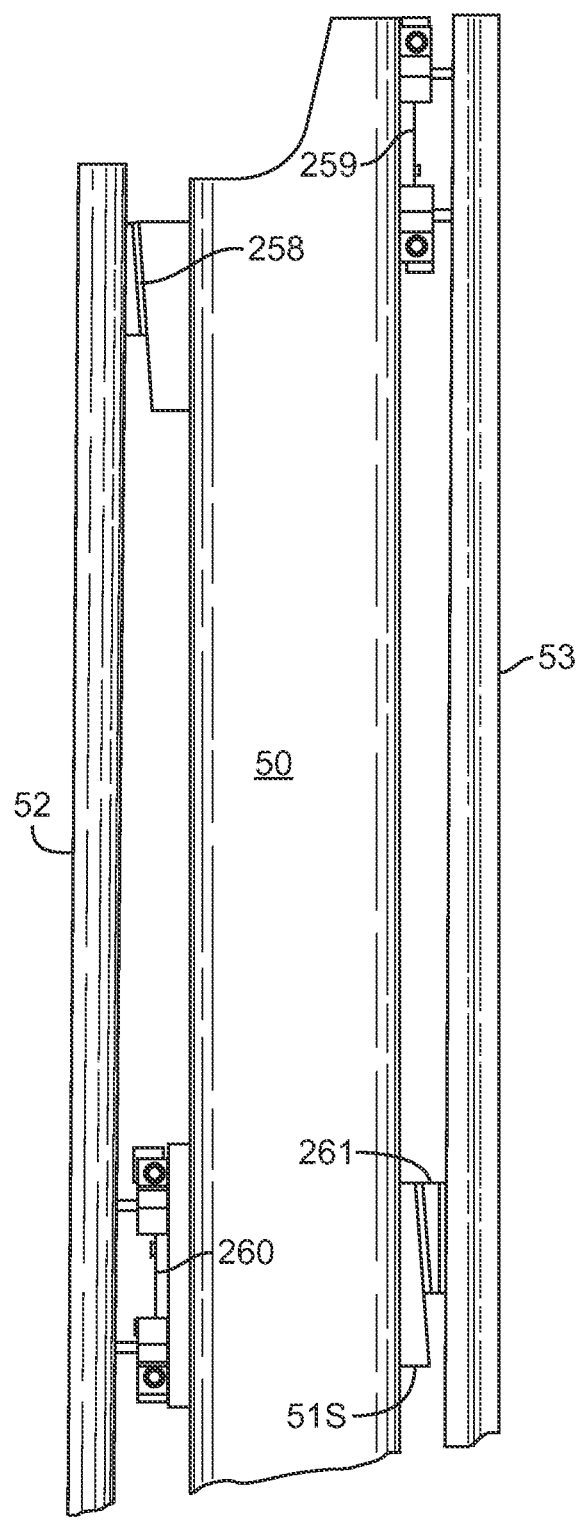
FIG. 31 shows a left side view of fixed angle load bearing pads, and adjustable clearance pads mounted on a runner, in relation to tracks, according to an embodiment of the invention.

Referring to FIGS. 31-40, embodiment of the present invention provide fixed angle load bearing pads 259, 260, and manually adjustable clearance pads 258, 261. Specifically, FIG. 31 shows a left side view of the load pads 259, 260, and adjustable clearance pads 258, 261 mounted on the runner member 50, in relation to the guide tracks 52, 53, in a column 45. As described in more detail further below, the clearance pad 258 is manually adjustable to allow changing the distance between the pad 258C and the guide track 52, and similarly, the clearance pad 261 is manually adjustable to allow changing the distance between the pad 261C and the guide track 53. In one embodiment, the clearance pad 258 is adjusted to maintain minimal gap between the pad 258C and the guide track 52 to ensure substantial contact therebetween, and the clearance pad 261 is adjusted to maintain minimal gap between the pad 261C and the guide track 53 to ensure substantial contact therebetween. In one example, each pad 258C, 259C, 261C and 260C has a rectilinear footprint about 2.5 inches by 2.5 inches or 6.35 centimeters by 6.35 centimeters.

Figure 32:
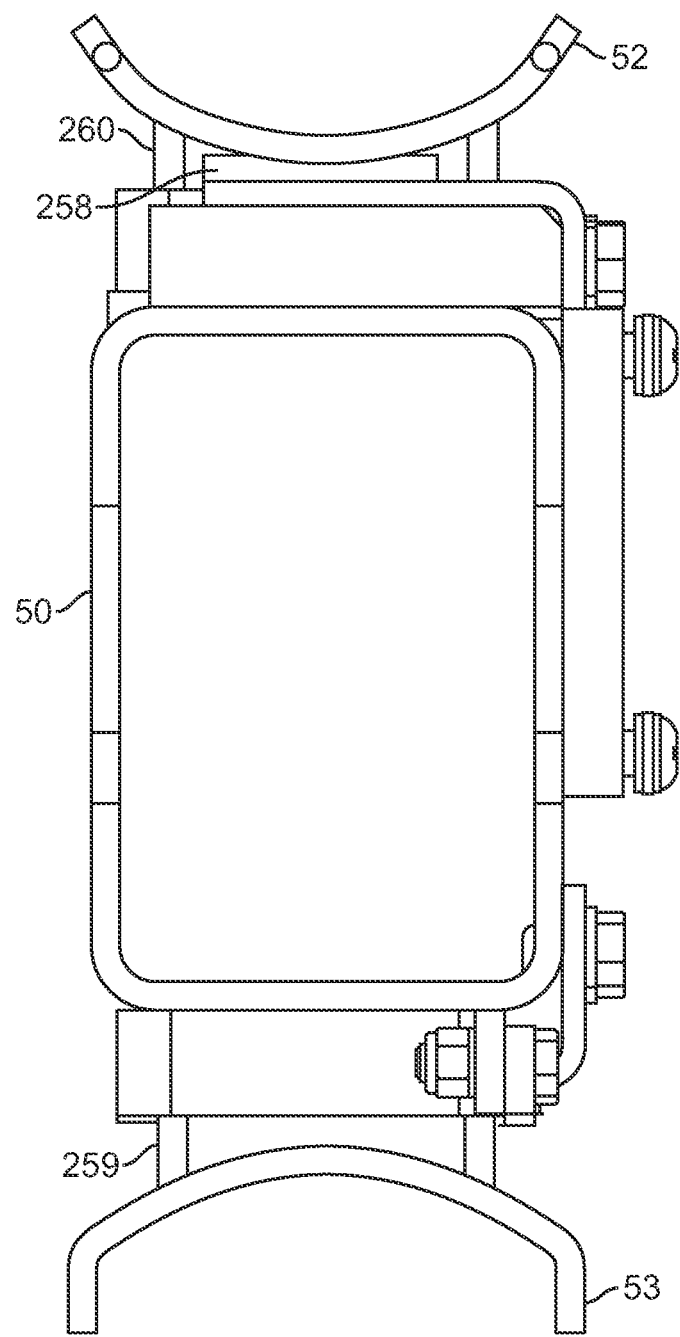
FIG. 32 shows an end view of fixed angle load bearing pads, and adjustable clearance pads mounted on a runner, in relation to tracks, according to an embodiment of the invention.
Figure 33:
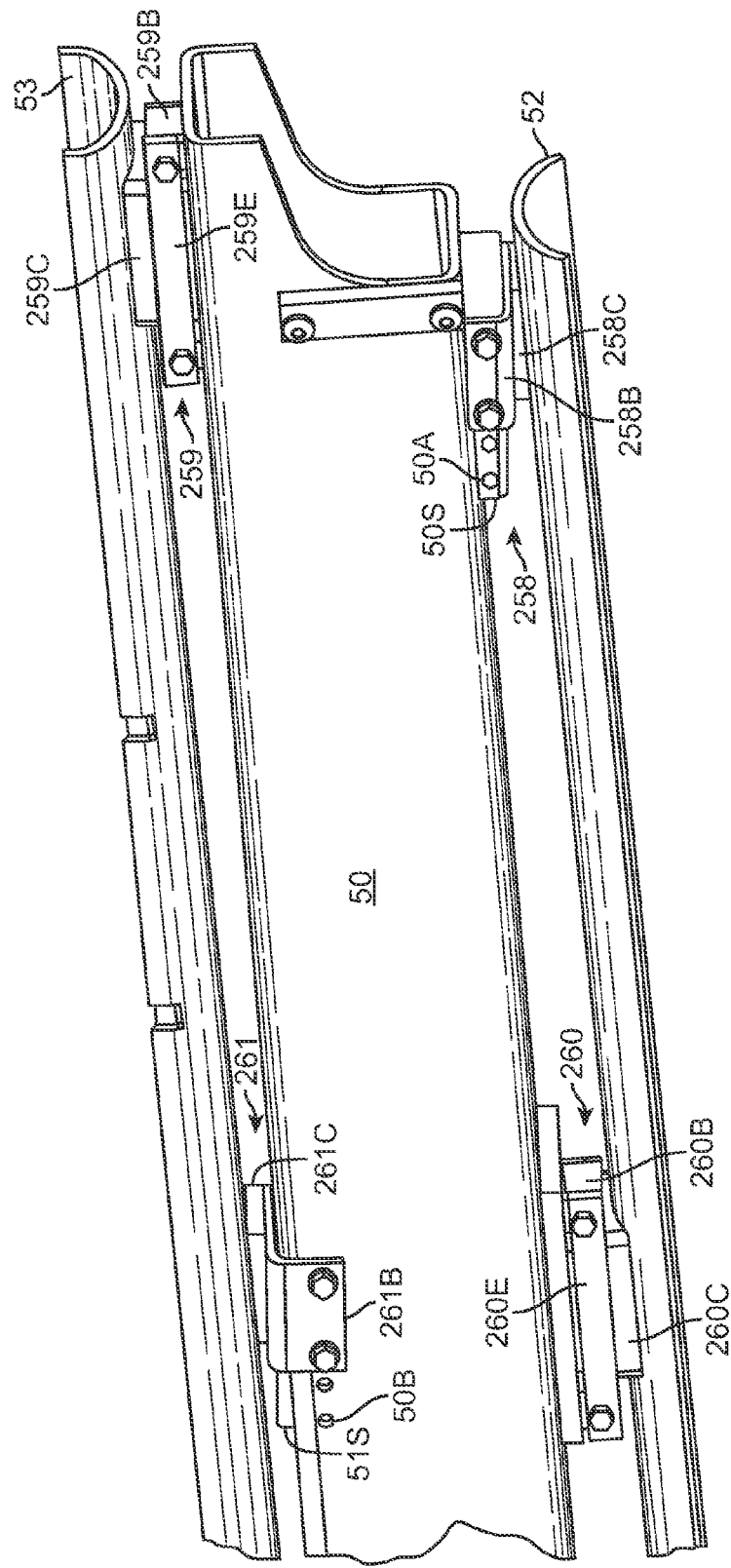
FIG. 33 shows a right side view of fixed angle load bearing pads, and adjustable clearance pads mounted on a runner, in relation to tracks, according to an embodiment of the invention.
Figure 34:
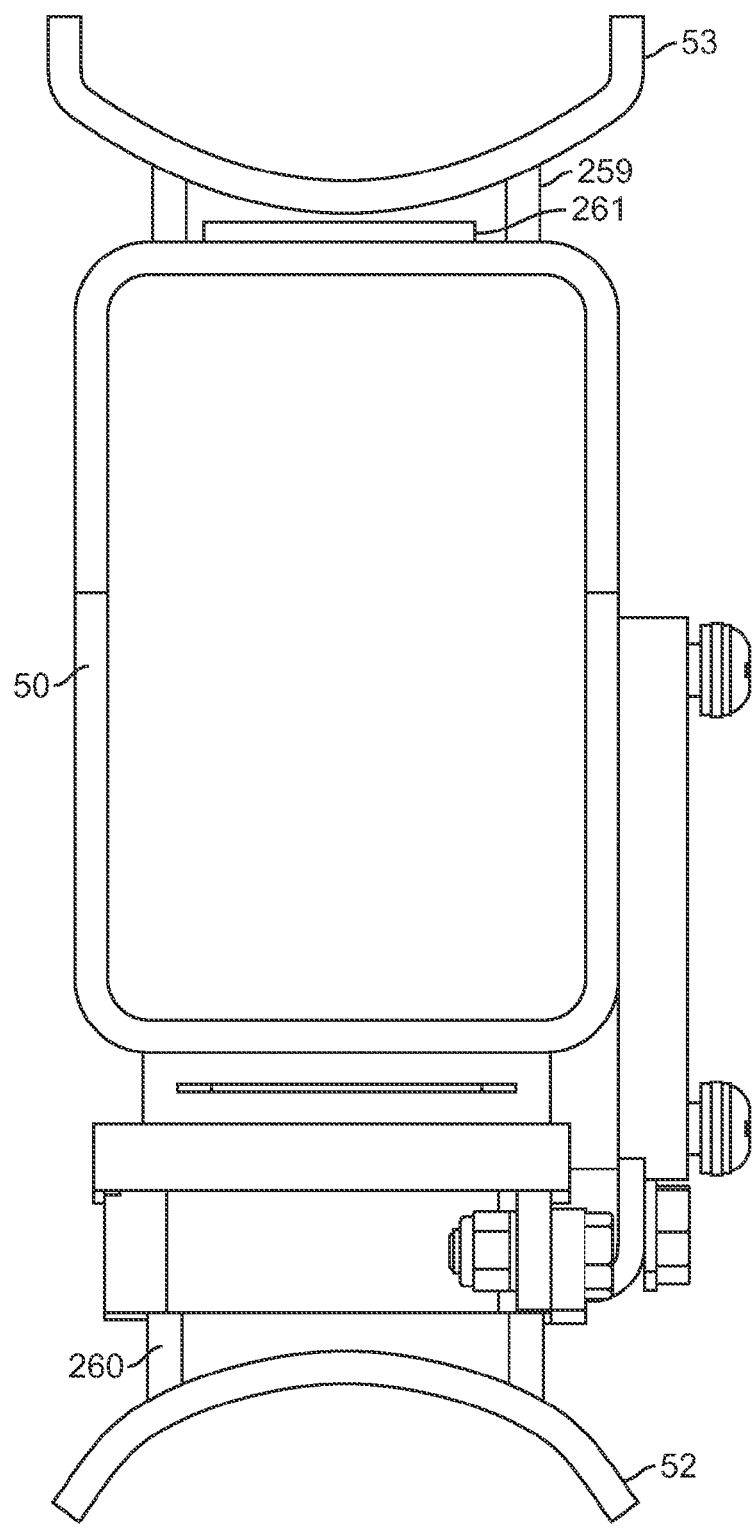
FIG. 34 shows an end view opposite to FIG. 32, according to an embodiment of the invention.

FIG. 32 shows an end view of the runner member 50 with the clearance pad 258 in front of the load bearing pad 260 against the guide track 52, and the clearance pad 261 (not shown) behind the load bearing pad 259 against the guide track 53. FIG. 33 shows a right side perspective view of the assembly of FIGS. 31-32. FIG. 34 shows an opposite end view to FIG. 32, depicting an assembly of the runner member 50 with the clearance pad 261 in front of the load bearing pad 259 against the guide track 53, and the clearance pad 258 (not shown) behind the load bearing pad 260 against the guide track 52.

Figure 35:
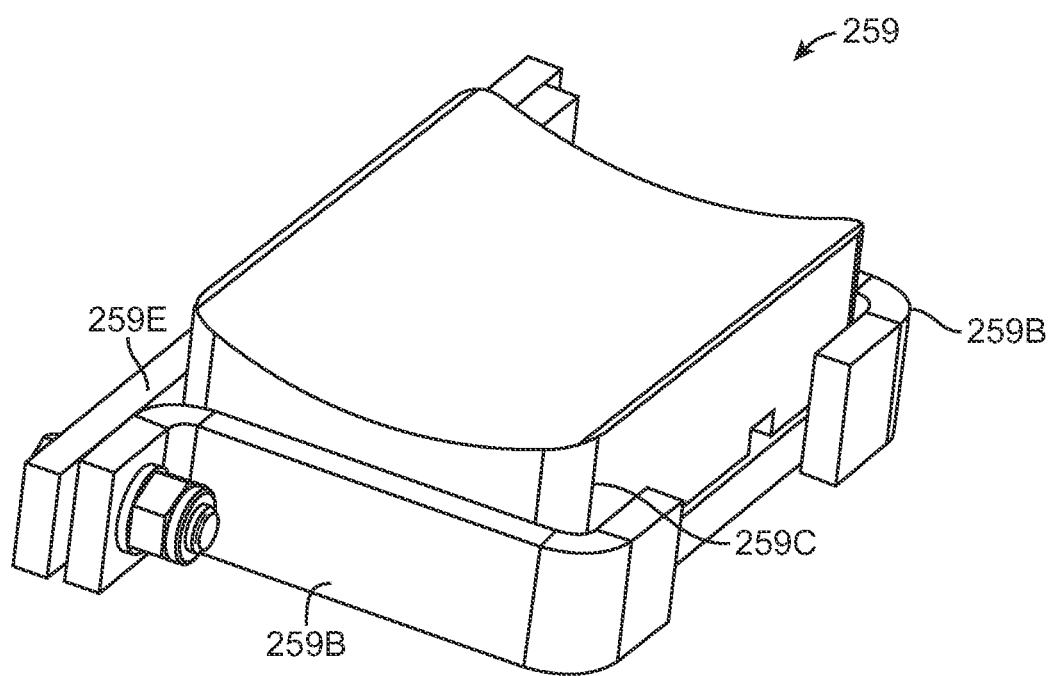
FIG. 35 shows a perspective view of a load bearing pad with mounting brackets, according to an embodiment of the invention.
Figure 36:
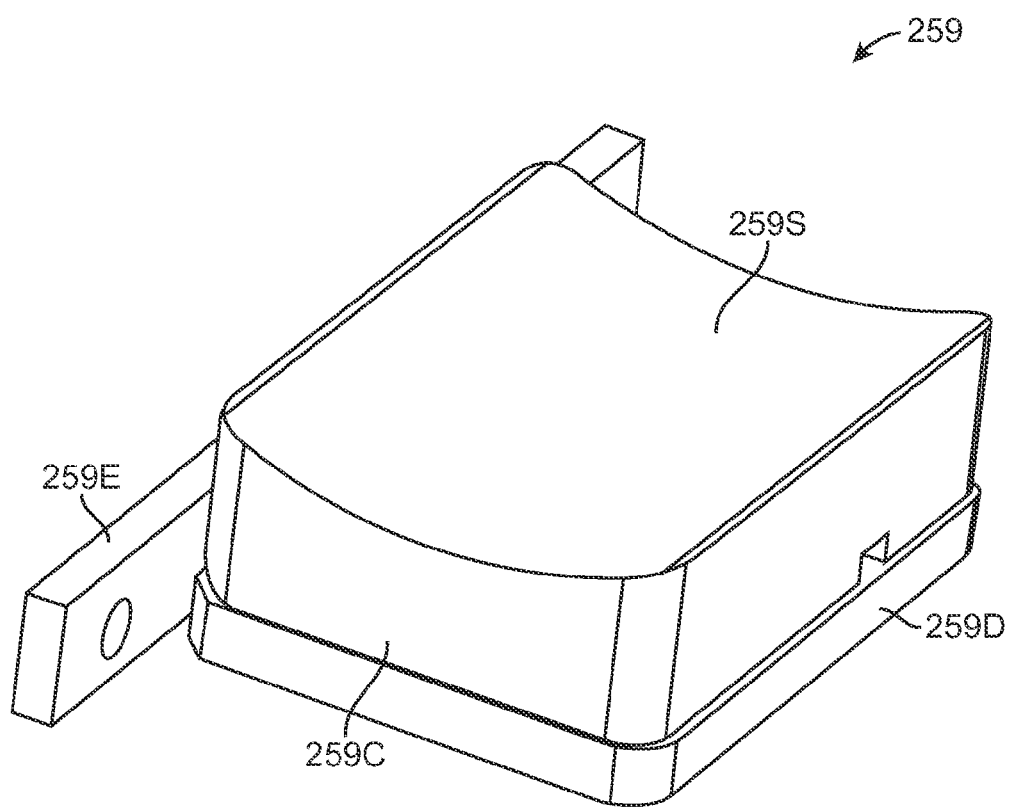
FIG. 36 shows a perspective view of a load bearing pad without mounting brackets, according to an embodiment of the invention.

FIG. 35 shows a perspective view of a load bearing pad 259 with mounting brackets 259B, 259E. The load bearing pad 259 is essentially rectangular and includes a support/mounting bracket 259B, for fixedly attaching the load bearing pad 259 to the runner member 50. The load bearing pad 259 includes a contact pad 259C, having a periphery of concave surface configuration formed on a radius matingly complementary to that of the surfaces of the guide tracks 52 and 53. FIG. 36 shows another perspective view of the load bearing pad 259 without the support bracket 259B. The contact pad 259C is substantially rectangular having a thickness, and concave contact surface 259S formed on a radius matingly complementary to that of the surfaces of the guide tracks 52, 53. The contact pad 259C is connected to a support base 259D having an attachment mounting bracket 259E.

Figure 39A:
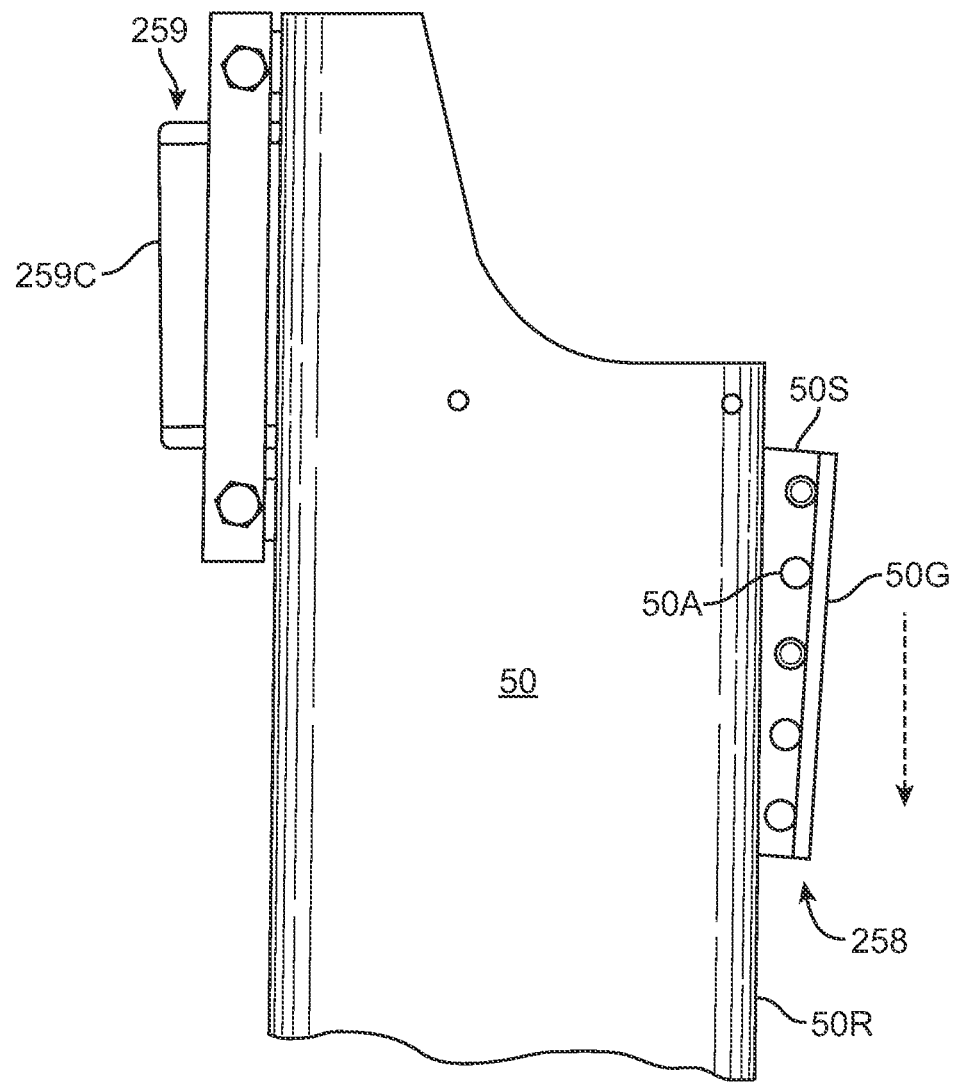
FIGS. 39A-39B show side views of mountings for adjustable clearance pads, according to an embodiment of the invention.
Figure 39B:
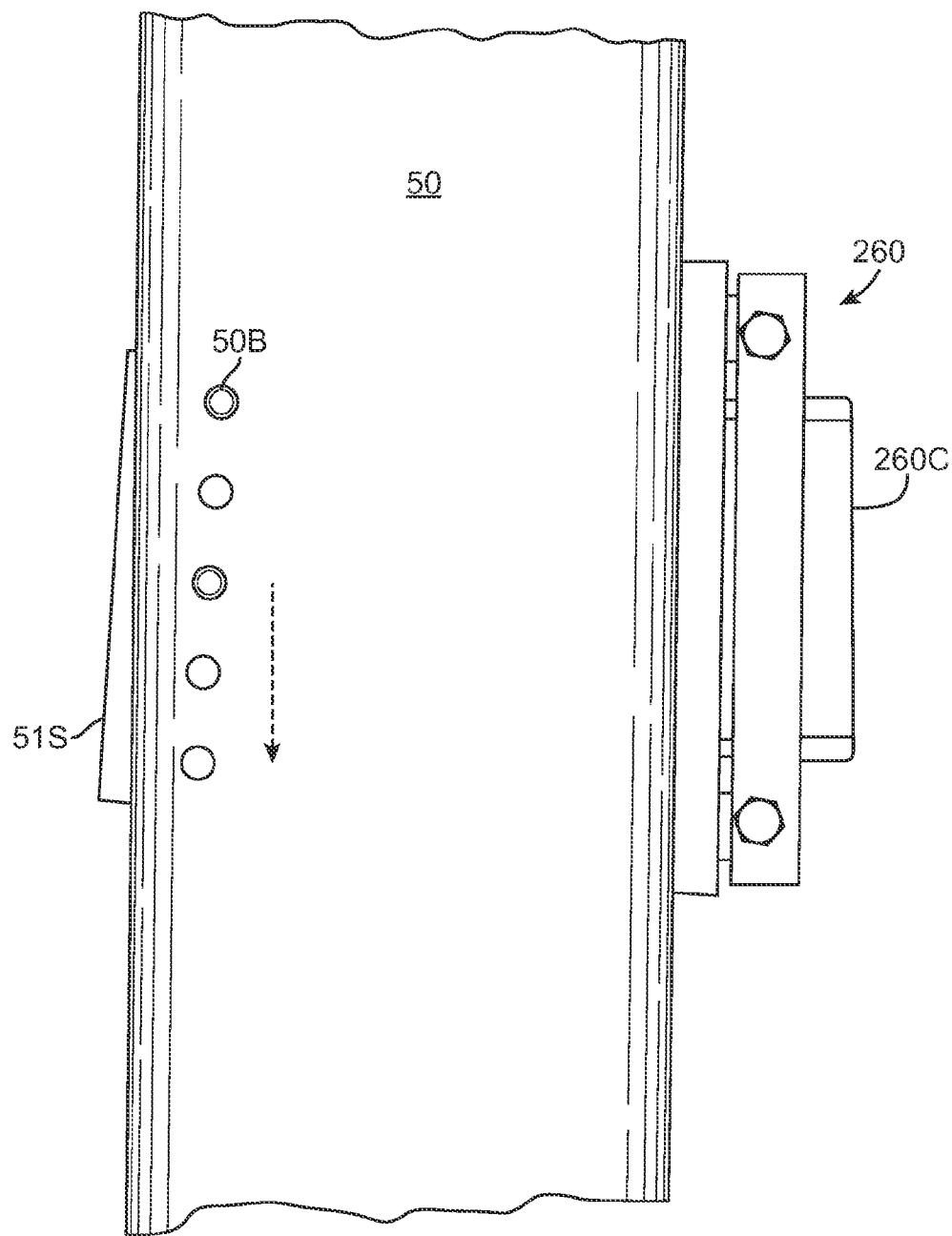
Figure 39C:
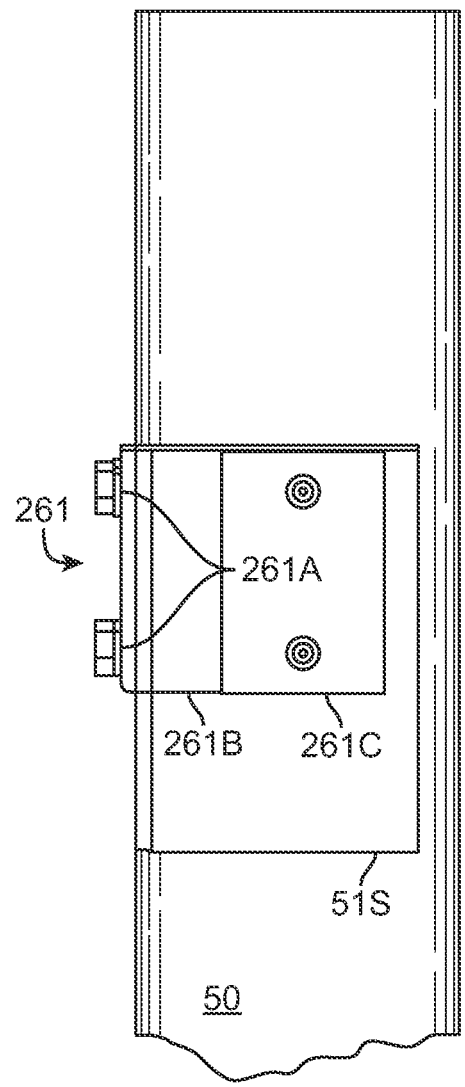
FIGS. 39C-39D show top views of a mounted adjustable clearance pad and a fixed angle contact pad, respectively, according to an embodiment of the invention.
Figure 39D:
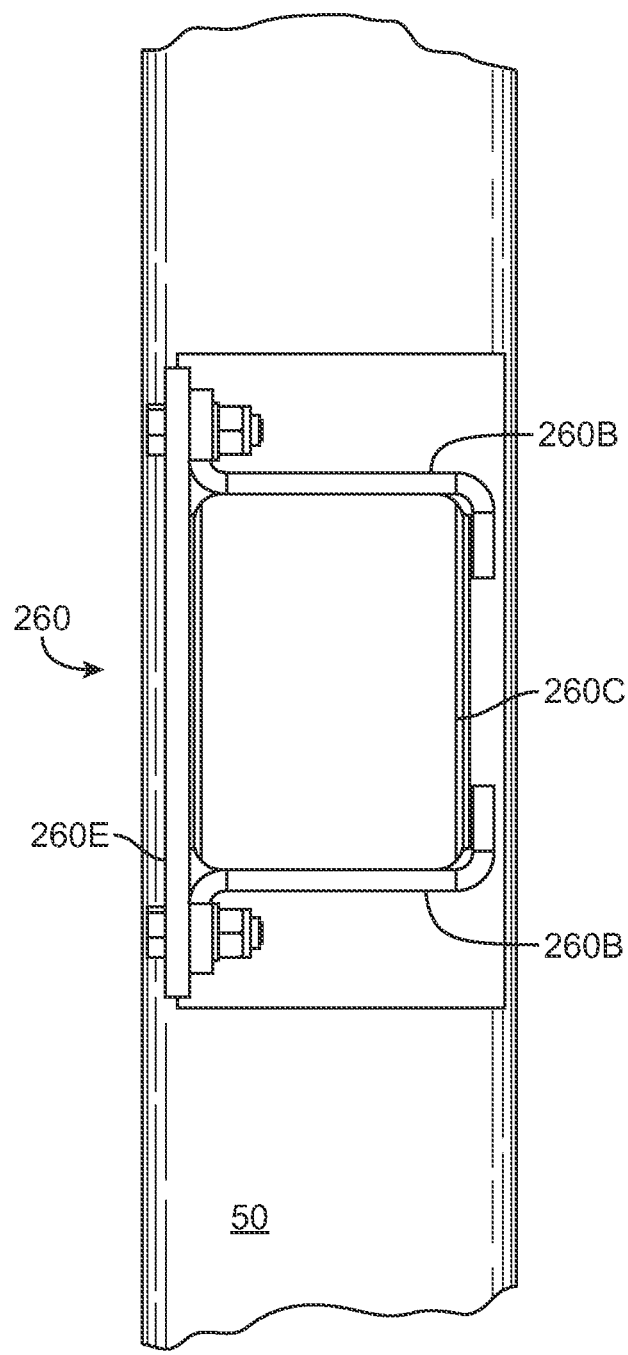

Referring to FIGS. 31, 33, the load bearing pad 260 is similar to the load bearing pad 259, and therefore not shown in detail. For example, FIG. 39D shows a top view of the load bearing pad 260 on the runner member 50, wherein similar to the load bearing pad 259, the load bearing pad 260 includes a contact pad 260C, support bracket 260B, and attachment bracket 260E (FIG. 33). Preferably, the pads 259C and 260C (FIG. 35) are of the same material as the pads 64C of the load pads 59, 60, above.

The contact pads 259C, 260C, for the load bearing pads 259, 260, respectively, and the corresponding guide tracks 53, 52, have the centers of their respective radii within a common vertical plane substantially bisecting the contact pads and the track surfaces. Load bearing pads 259 and 260 are thus matingly engaged by the track surfaces throughout their axial width. The contact pads 259C, 260C for load bearing pads 259, 260 have a low coefficient of friction and are adapted to cushion the corresponding runner during reciprocation and against vibration, and may be made of a hard plastic material or a high density polymer although a metallic material can also be used.

Figure 37:
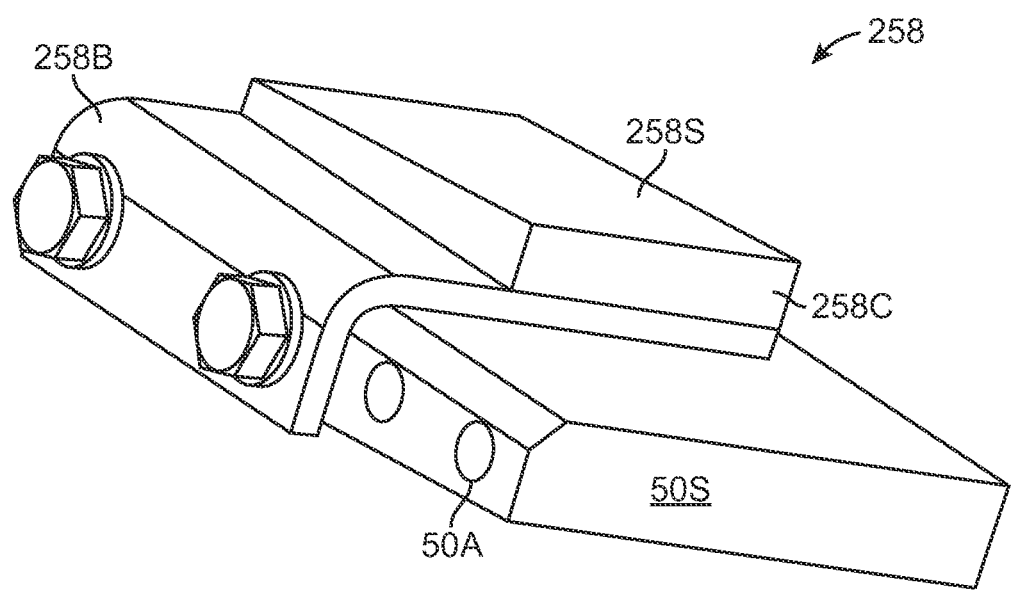
FIG. 37 shows a perspective view of an adjustable clearance pad, having a contact pad with an essentially rectangular shape and tapered profile and planar contact surface for contact with tracks, according to an embodiment of the invention.
Figure 38:
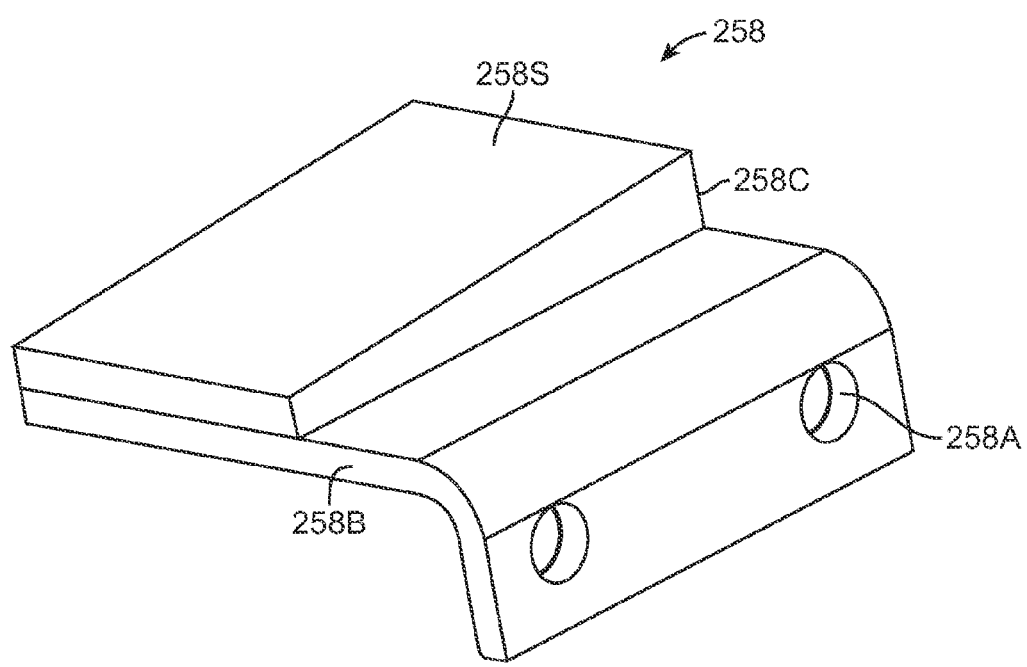
FIG. 38 shows another perspective view of an adjustable clearance pad, according to an embodiment of the invention.

FIG. 37 shows a perspective view of an adjustable clearance pad 258, having a contact pad 258C with an essentially rectangular shape and a thickness that in one example has a tapered profile in one dimension. The contact pad 258C further has a planer contact surface 258S for contact with the surface of the guide track 52. As shown in FIGS. 37 and 38, the clearance pad 258 includes a mounting member comprising an adjustment system including an L-shaped support base 258B having a spaced apertures 258A to adjustably connect the clearance pad 258 to the runner member 50.

In one embodiment of the invention, an essentially wedge-shaped (tapered) spacer 50S is used for the adjustable clearance pad 258 (also shown in perspective view in FIGS. 33, 37, and side view in FIG. 39A), wherein the spacer 50S includes multiple apertures 50A spaced along its length in sequence similar to the spacing of the apertures 258A. The edge 50G of the spacer 50S has a downward slope (transverse angle) in relation to right edge 50R of the runner member 50. As shown in FIG. 39A, moving down along the dashed arrow (along the lengths of the spacer 50S and the runner member 50), there is a decrease in distance between apertures 50A and to the bottom of the spacer 50S adjacent to the right edge of the runner member 50. As such, the apertures 50A closer to the bottom of the drawing page are nearer to the right edge of the runner member 50 than the apertures 50A closer to the top of the drawing page. The apertures 50A along said downward slope of the spacer 50S towards the runner member 50, allow adjusting the clearance (distance) between the clearance pad 258C and the track 52 (FIGS. 40A-40C), as described below.

According to embodiments of the invention, changing the number of apertures 50A on the spacer 50S and/or the changing the angle of said downward slope on the spacer 50S towards the runner member 50, provides variation in the successive amounts of clearance that can be achieved between the pad 258C and the guide track 52. The higher the number of apertures 50A and the smaller the slope angle of the spacer edge 50G in relation to the runner edge 50R, the higher the number of incremental clearance adjustments possible.

Figure 40A:
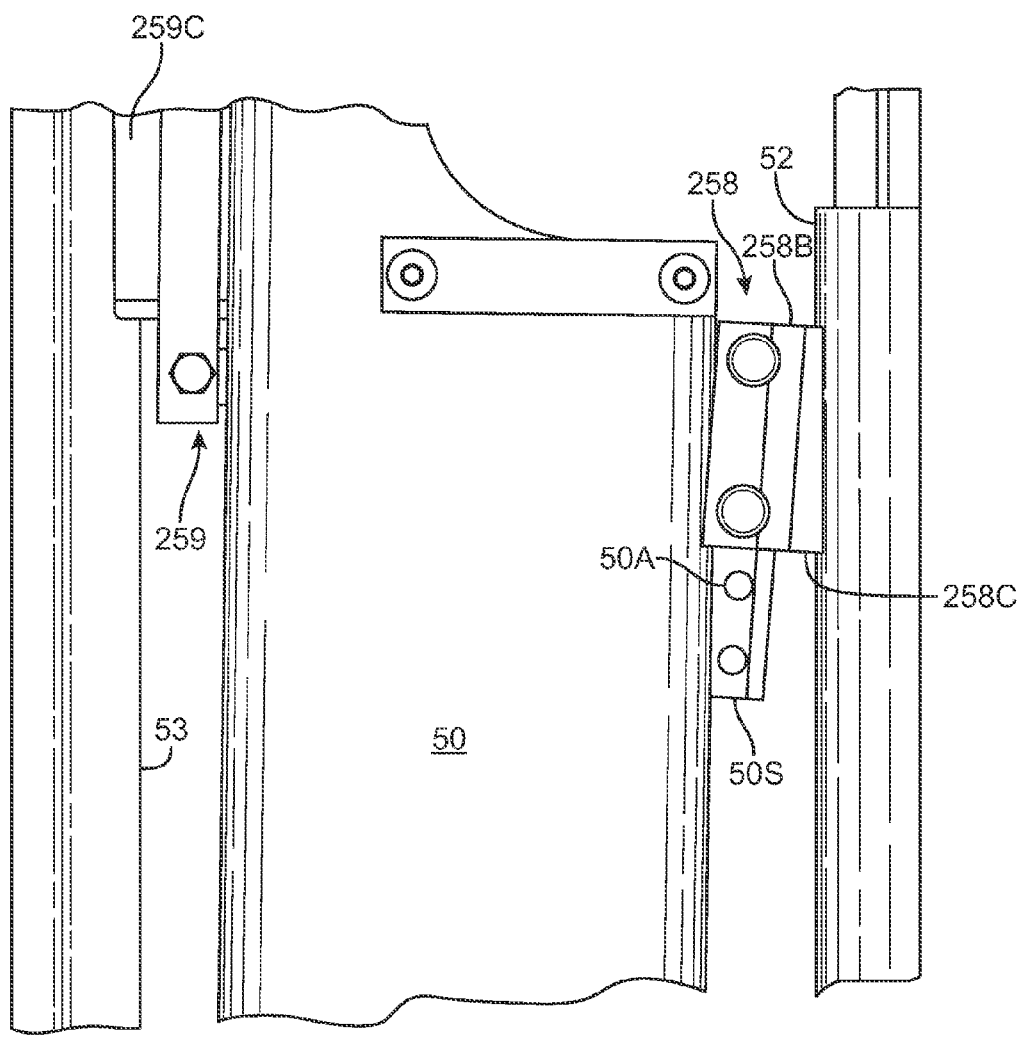
FIGS. 40A-40C show side views of mounted adjustable clearance pads, according to an embodiment of the invention.
Figure 40B:
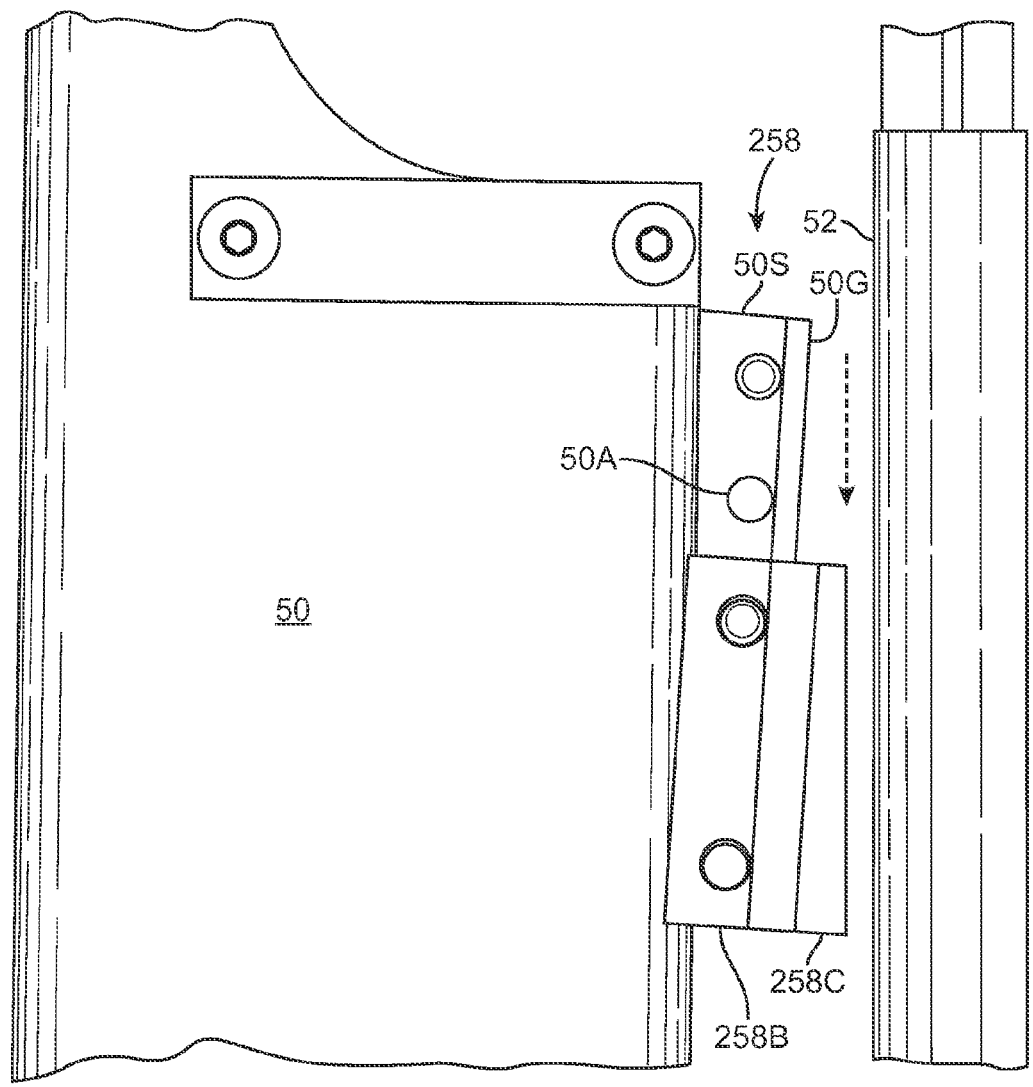

For example, referring to FIGS. 40A and 40B, to increase the distance between the contact pad 258C and the guide track 52, the clearance pad 258 is shifted down along dashed arrow in FIG. 40B, and lined up with selected apertures 50A on the spacer 50S. To decrease clearance between the clearance contact pad 258C and the guide track 52, the clearance pad 258 is shifted up in the opposite direction and lined up with selected apertures 50A on the spacer 50S. In one embodiment, the clearance pad 258 is shifted up until the pad 258C is jammed against the guide track 52. Then, the clearance pad 258 is shifted down slightly until the apertures 258A on the support base 258B lineup with the closest pair of apertures 50A on the spacer 50S. The clearance pad 258 is attached to the spacer 50S with screws through the apertures 258A and selected apertures 50A, thereby providing a desired clearance between the clearance pad 258C and the guide track 52.

The distance between the clearance pad 261 and the guide track 53 is similarly adjustable, as described below. As shown in FIGS. 33 and 39B, the runner member 50 includes multiple apertures 50B for the adjustable clearance pad 261, wherein the apertures 50B are spaced along the length of the runner member 50. The clearance pad 261 includes spaced apertures 261A in a support base 261B (FIG. 39C), allowing the support base 261B of the clearance pad 261 to be connected to the runner member 50 at different positions on the apertures 50B along the length of the runner member 50. As shown in FIG. 39B, the apertures 50B have a reduced distance to the left edge of the runner member 50 moving down (dashed arrow in FIG. 39B), along the length of the runner member 50. As such, the apertures 50B closer to the bottom of the drawing page are nearer to the left edge of the runner member 50, than the apertures 50B closer to the top of the drawing page. The apertures 50B along a downward slope on the runner member 50 towards the left edge of the runner member 50, allow adjusting the clearance (distance) between the clearance pads 261 and the guide track 53. Further, as shown in FIGS. 31, 33 and 39C, a wedge shaped spacer 51S may be used in between the base of the clearance pad 261 and the runner member 50.

To increase the distance between the clearance contact pad 261C and the guide track 53 (FIG. 33), as shown in FIG. 39B the clearance pad 261 is shifted down (along dashed arrow in FIG. 39B) and lined up with selected apertures 50B. To decrease clearance between the clearance contact pad 261C and the guide track 53, the clearance pad 261 is shifted up in the opposite direction and lined up with selected apertures 50B. The clearance pad 261 is attached to the runner member 50 with screws through the apertures 261A and selected apertures 50B.

Figure 40C:
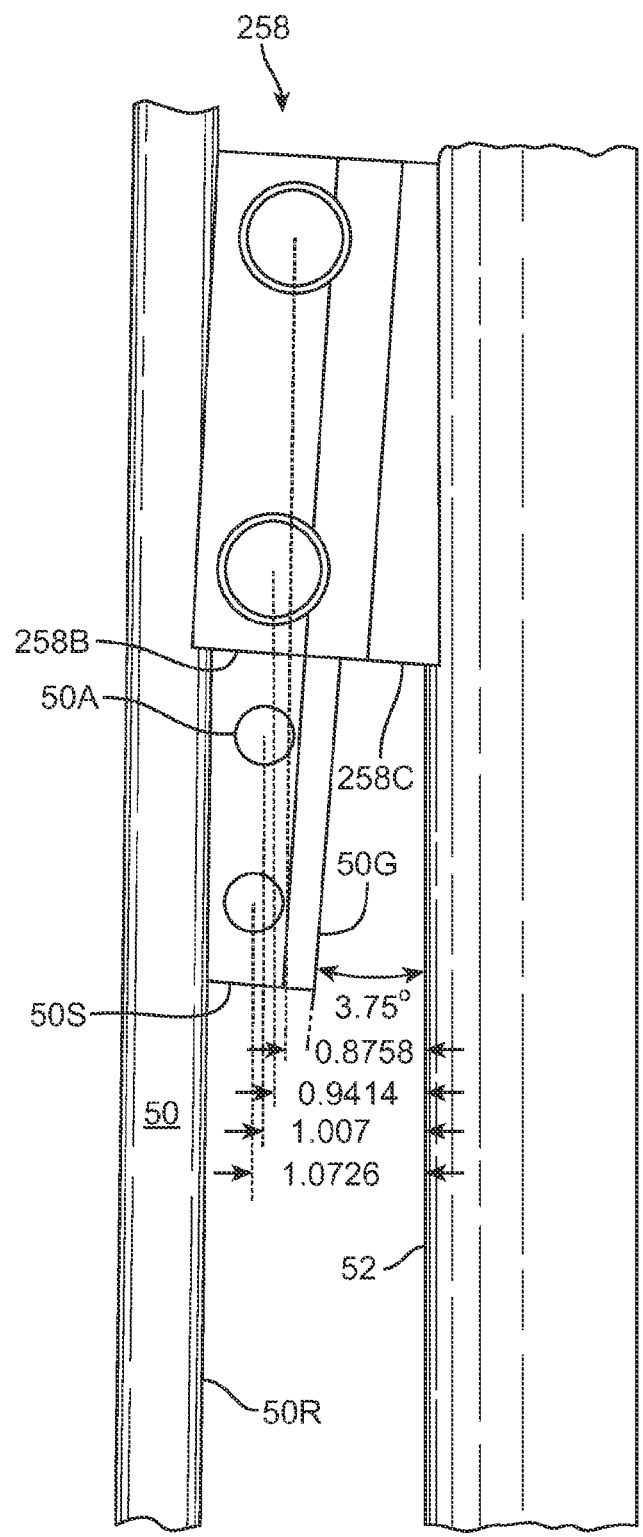

FIG. 40C shows example distances between the apertures 50A of the spacer 50S and the guide track 52 based on location of each aperture 258A for the clearance pad 258. In this example, there are four apertures 50A, at 0.0656 inch or 1.6662 centimeter distance increments relative to the guide track 52, providing distances of 1.0726, 1.007, 0.9414, and 0.8758 inches or 2.7244, 2.5578, 2.3915, and 2.50845 centimeters, respectively. In this example, the sloped (tapered) spacer edge 50G of the spacer 50S forms about 3.75° angle with the runner edge 50R, and similarly a 3.75° angle with the top line of the convex guide track 52. In one example, said angle can range from about 2° to 5°. Other ranges are possible. Similar or different dimensions and angles may be used for the clearance pad 261. Such adjustability in clearance eases manufacturing and allows ability for more tolerance for assembly.

When the clearance between the pads and the tracks increases due to pad wear in use, the runner member 50 may work eventually itself out of the retaining column (C or S). In one embodiment, the clearances between the pads and the tracks can be adjusted while the liftgate is in the field. As needed, additional spacers/plates may be placed between spacer 50S and the runner member 50 for additional adjustment range and maintaining a desired clearance between the pads and the tracks to maintain proper operation of the runner member 50 in the retaining column 45.

In one embodiment, the clearance pads utilize a wedge design wherein the clearance pad position allows change in clearance between pad and the track. A load bearing pad such as 59 or 259 is self-adjusting for the load bearing surface to have maximum contact with the track surfaces. Such adjustability eases manufacturing and allows ability for more tolerance for assembly.

According to an embodiment of the invention, adjustment of the distance between the clearance pads and the tracks can be accomplished using springs, wherein the clearance pads are spring loaded against the tracks.

According to an embodiment of the invention, the load bearing pad surfaces such as 258S may have curved (concave/convex) surfaces.

Figure 41:
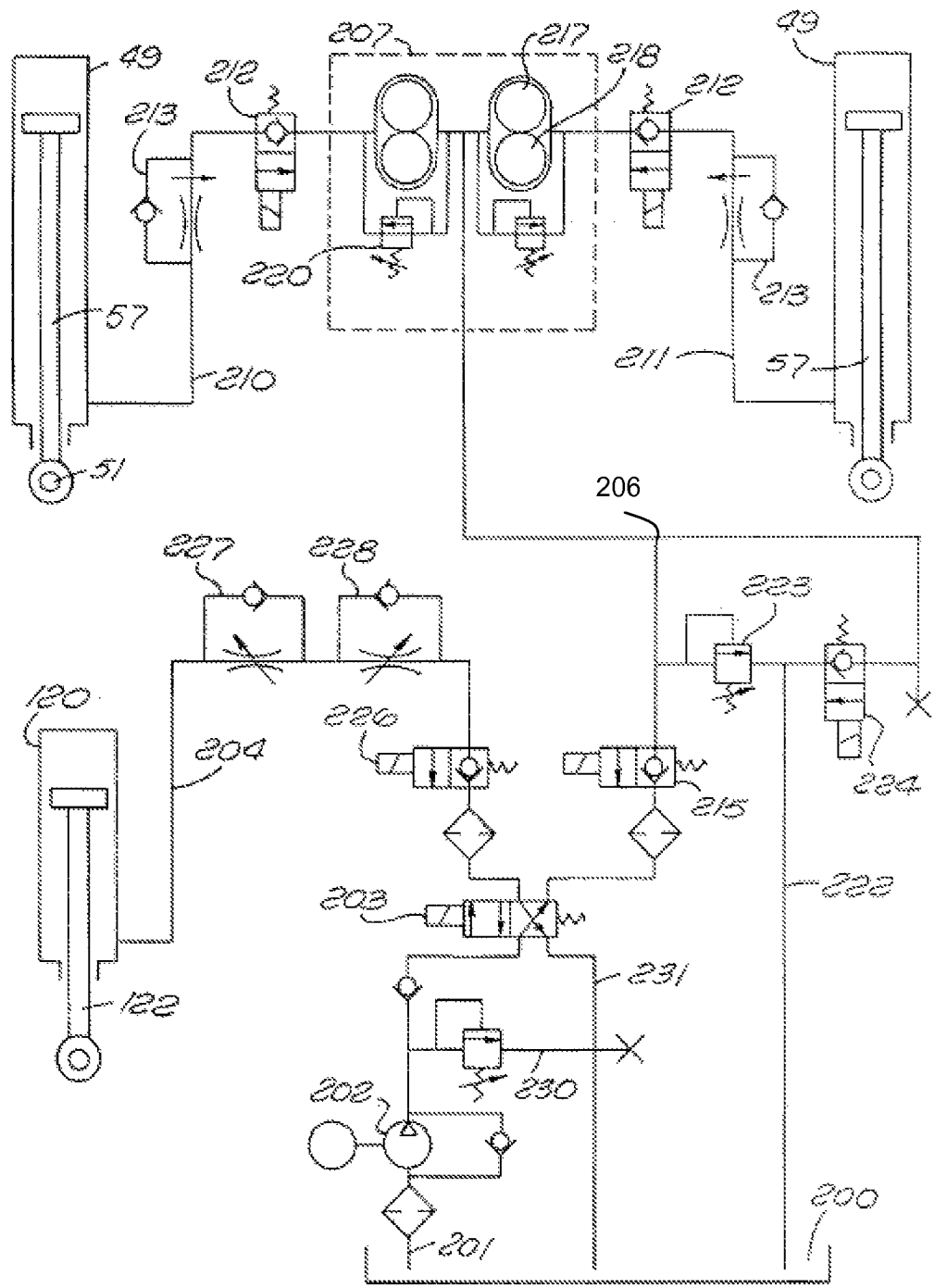
FIG. 41 shows a schematic drawing of the equalizing circuit for the main power cylinders of the curb side and street side columnar power assemblies, according to an embodiment of the invention.

FIG. 41 is a schematic diagram of the hydraulic circuit employed in a lift gate system, according to an embodiment of the invention. The circuit comprises a reservoir 200 communicating with a supply line 201 that passes through a motor and pump assembly 202. The downstream end of the supply line 201 communicates with a selector valve 203 by means of which fluid under pressure can be communicated alternatively to either a conduit 204 leading to the lower end of the platform power cylinder 120 or a conduit 206 communicating with the input port of a flow divider 207. An opposite pair of outlet ports of the divider have fluid communication via conduits 210 and 211, respectively, with the piston rod ends of the pair of power cylinders 49. Each of the conduits 210 and 211 incorporates a solenoid controlled normally open hydraulic lock valve 212, fitted with a manual override, as well as a pressure compensated velocity control valve 213.

When the selector valve 203 is actuated in a mode for lifting the load carried by the piston rods of the cylinders 49, a solenoid controlled check valve 215 in the conduit 206 is opened to supply pressurized fluid to the input port of the flow divider 207. The flow divider body has an inlet communicating with a pair of passages for dividing the flow of hydraulic fluid between the inlet and the pair of power cylinders 49. Each of the pair of passages communicating to the power cylinders is fitted with a means for positively displacing and being positively displaced by the fluid flowing therethrough. The flow divider 207 may be Model No. PM6, obtainable from MTE Hydraulics, Inc., of Rockford, Ill., which contains two pairs of spur-toothed idler rotors 217 and 218, there being one such pair within the flow passage to each of the conduits 210 and 211. Each idler rotor 217 meshes with its companion idler rotor 218. At the same time, the two idler rotors 217, 218 are keyed together for synchronous rotation, as by mounting on a common shaft, as are the two idler rotors 218 at the diametral plane of the flow passage. The resulting synchronized rotation of each companion pair of idler rotors 217 and 218 occurs simultaneously in either direction, as driven by and depending on the direction of flow through the outlet ports. Associated with each outlet to conduits 210 and 211, spanning opposite sides of the companion pair of idler rotors 217 and 218, is a shunt conduit incorporating a relief valve 220 that opens in response to a pre-determined back pressure from the associated cylinder 49 to recirculate fluid through the shunt.

Between the check valve 215 and fluid divider 207, the conduit 206 has a shunt circuit including a return line 222 having a relief valve 223 on one side and a solenoid controlled valve 224 on the other side of an inlet to a return line 222 to the reservoir 200.

When the selector valve 203 is set into a mode to communicate fluid pressure to the conduit 204 for the platform cylinder 120, a solenoid check valve 226 in the conduit 204 is opened to pass pressurized fluid to the lower end of the platform cylinder 120. The conduit 204 also incorporates a pair of flow control valves 227 and 228, one of which is adjusted to vary the rate of movement of the cylinder piston in one direction while the other may be adjusted to vary the rate of movement of the cylinder piston in the other direction.

The hydraulic circuit may also incorporate a known auxiliary circuit 230 incorporating a relief valve and hand-pump mechanism in order to operate the liftgate in the event of failure of the motor and pump assembly 202. In the interest of clarity, return lines from the butt ends of the cylinders 49 and 120 to the reservoir 200 have not been shown. However, it will be understood that return lines comprise normal parts of the circuit. In a case where the cylinders are of the single acting type, the return lines will comprise low pressure breather lines. In a case where double acting cylinders are desired, high pressure lines will be employed and the selector valves accordingly modified.

The mode of operation of the invention should be apparent to those of ordinary skill in the art from the foregoing description and the drawings. Summarizing, let it be assumed that the platform sections are in the fully folded and raised transit position of FIG. 4. Upon actuation of the electrical control system in a mode to open the valves 203 and 215, fluid is evacuated through the lower ends of the pair of cylinders 49 through conduits 210 and 211, normally open valves 212, conduit 206, valves 215 and 203 and into a reservoir return line 231 as the platforms descend under the influence of gravity. During descent of the platform, after the wedge block 115 clears the cam block 117 both platform sections are maintained in a substantially erect position by the hydrostatic head under the piston of the platform cylinder 120 as checked by the normally closed solenoid check valve 226. Assuming it is desired to maintain the platforms in dock loading position, the folded platforms are then lowered to ground level.

Assuming the platform sections are to be opened into a common horizontal plane for loading and unloading, after the wedge block 114 has cleared the cam block 117, further downward movement of the platforms is arrested by release of the control switch to thereby effect closure of the valves 203 and 215. Thereupon, the electrical control circuit is operated in a mode to open the valve 203 into communication with the conduit 204 while obturating the conduit 206. Simultaneously, the solenoid check valve 226 is opened. As the pump and motor 202 is idle in this phase and as the weight of the platform sections is rearwardly over-center with respect to the platform pivot/hinge pins 128, the platforms are gravitationally biased into the full open position as fluid drains from the bottom end of the platform cylinder 120 through the conduit 204, conduit 206, selector valve 203, and reservoir return line 231. The rate of opening may be altered by means of the flow control valve 228.

Thereafter, each bracket flange 148 now being seated in its internal slot 160, loading and unloading operations can be carried out on the open platform assembly P by appropriate actuation of the valve 203 and motor and pump assembly 202. During raising and lowering synchronized movement of the piston rods of the pair of cylinders 49 and a substantially horizontal attitude of the platform assembly P is maintained by the pair of idler rotors 217, 218 or by the combination of the operation of the idler rotors and the mutual interaction of the platform hinge flanges 148 and runner bracket internal slots 160. Thus, the keyed together pairs of idler rotors 217, 218, while operating synchronously, nevertheless appear to permit leakage therearound internally of the body of flow divider 207 in a manner to equalize or stabilize hydraulic pressures within the pair of cylinders 49. At the same time, each of the platform/hinge contacts 148, 160 at each side of the platform at all times operate to maintain or force the adjoining side portion of the forward platform section 78 into an orthogonal relationship relative to the vertical axis of the companion column assembly, which force is translated through the structural beam forward edge of the forward platform section 78 to the bracket combination 148, 160 on the other side of the platform. Thus, if one side of the platform tends to lag behind the other side, the first side is borne along by virtue of the bracket interconnection, via the platform, to the opposite side runner member 50. The converse is equally true in that a runner assembly on one side of the platform moving in advance of the runner assembly on the other side tends to carry along the runner assembly of the other side via the interaction of the brackets and platform hinge connections 148, 160.

To close the platform assembly P and raise it to transit position, the open platform is first elevated to a slightly above ground position sufficient to provide clearance for movement of the rear platform section 79 in the mode shown in FIG. 6. The valve 203 is then energized to pass fluid pressurized by the pump 202 through the conduit 204 into the lower end of the cylinder 120. The two platform sections are thus folded together into the substantially vertically erect condition shown in FIG. 11 while the actuator arms 93 and their corresponding link chains 92 are simultaneously restrained into alignment with their respective clearances at opposite sides of the platform (e.g., FIG. 5). Thereafter, the selector valve 203 is operated in a mode to close the conduit 204 and to pass pressurized fluid into the conduit 206 for raising the collapsed platform sections and squeezing them together by the action of the cam block 117 and wedge block 114 in the manner previously described. The platform sections are thus raised from the FIG. 11 condition into the FIG. 10 condition to an upper limit shown in FIG. 15. Raising of the platform sections to the upper limit effects closure of the normally open valves 212 (FIG. 15) thus effecting a hydraulic lock at each side of the raised platforms to maintain their transit position.

Figure 42:
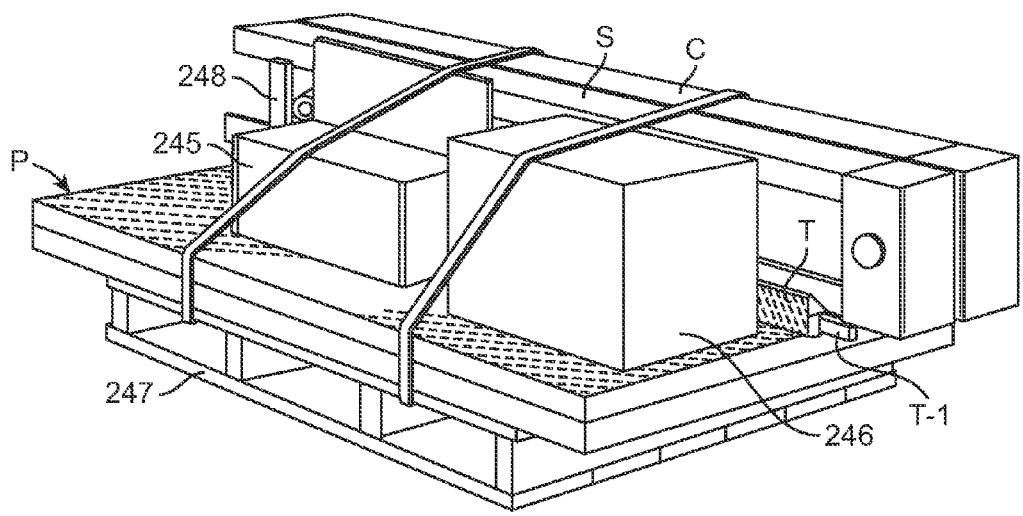
FIG. 42 shows a schematic representation of the several components of a liftgate of the invention as bundled for shipment to a point of application to a vehicle or other point of use, according to an embodiment of the invention.

As shown in FIG. 42, the components of the liftgate may be packed for shipment to an end-user as an unassembled package of components. Thus, the package may comprise street side and curb side columnar power assemblies C and S, a threshold plate T, a platform assembly P of one or more sections, a power pack 245, and a parts box 246, all conventionally strapped to a conventional pallet 247. In order to maintain its runner assembly and power cylinder in a fully retracted condition during shipping and handling, each columnar power assembly may have a shipping strap 248 tack welded thereto to engage the underside of the bearing 75 (FIG. 15). The package may include special mounting fixtures whereby the threshold plate T is first secured in place followed by attachment of the street side and curb side column assemblies S and C to the rear of the truck to be squared up relative to the threshold plate T and indexed on pins T-1 projecting from opposite ends of the threshold plate. The platform assembly P can then be positioned in place for the reception of the pair of platform pivot pins 128 after which the upper ends of the pair of link chains 92 are connected to the pivot arms 90 of the pair of runner assemblies.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A lift comprising:
   a vertically extending parallel pair of fixedly spaced apart guide surfaces;
   a linear actuator suspended vertically between said pair of guide surfaces;
   a vertically elongate runner member having a pivotal connection to a lower end of said linear actuator to be vertically reciprocated by said actuator;
   a load bearing member at a lower end of said runner member at a location spaced downwardly from said pivotal connection; and
   a vertically spaced apart pair of sliding clearance members mounted on said runner member for relatively slidable contact with said pair of guide surfaces during vertical reciprocation of said runner member by said actuator, a first one of said sliding clearance members being mounted at an upper end of said runner member, a second of said sliding clearance members being mounted on an intermediate portion of said runner member between said first sliding clearance member and said pivotal connection, wherein said pair of sliding clearance members are mounted on opposite sides of said runner member for contact with opposite ones of said pair of guide surfaces;
   wherein each of said sliding clearance members comprises a projecting contact pad having a surface for slidable contact with one of said guide surfaces;
   wherein each of said sliding clearance members comprises an adjustable mounting mechanism for adjustably mounting the sliding clearance member on the runner member to maintain substantial uniform contact therebetween essentially throughout an axial width of said contact pad;
   wherein each sliding clearance member comprises:
      a clearance contact pad having a surface for slidable contact with one of said guide surfaces; and
      a mounting system supporting the clearance contact pad, for adjustably mounting the clearance contact pad on the runner member, the mounting system including an adjustment system for selectively adjusting the distance between the clearance contact pad and the respective guide surface; and
   wherein said adjustment system comprises:
      a base configured for supporting the clearance contact pad; and
      a tapered spacer mounted on the runner opposite a guide surface, the spacer including engagement mechanisms for engaging the base at different locations along the length of the spacer for selectively adjusting the distance between the clearance contact pad and the guide surface.

2. The lift of claim 1, further comprising:
   a pair of load contact members, wherein a load contact member comprises:
      a load contact pad having a substantially planar surface for slidable contact with one of said guide surfaces; and
      a mounting system including a base supporting the load contact pad, for mounting the load contact pad on the runner member substantially opposite a corresponding sliding clearance member.

3. The lift of claim 2, wherein:
   each sliding clearance member comprises a clearance contact pad having a substantially planar surface for slidable contact with one of said guide surfaces.

4. The lift of claim 3, wherein:
   a first one of said sliding clearance members is at a rear side of said lift;
   a second one of said sliding clearance members is at a forward side of said lift; and
   said load bearing member is configured to support a load at said rear side of said lift for biasing, via said runner member, said second clearance contact member against a front one of said guide surfaces and biasing said second clearance contact member against a rear one of said guide surfaces.

5. The lift of claim 4, wherein:
   each of said guide surfaces comprises a curved track surface for contact with one of said clearance contact pads; and said pair of sliding clearance members and said pivotal connection of said runner member are so oriented relative to one another such that a longitudinal axis of said runner member is misaligned relative to a longitudinal axis of said guide surfaces.

6. A lift comprising:
a vertically extending parallel pair of fixedly spaced apart guide surfaces;
a linear actuator suspended vertically between said pair of guide surfaces;
a vertically elongate runner member having a pivotal connection to a lower end of said linear actuator to be vertically reciprocated by said actuator;
a load bearing member at a lower end of said runner member at a location spaced downwardly from said pivotal connection; and
a vertically spaced apart pair of sliding clearance members mounted on said runner member for relatively slidable contact with said pair of guide surfaces during vertical reciprocation of said runner member by said actuator, a first one of said sliding clearance members being mounted at an upper end of said runner member, a second of said sliding clearance members being mounted on an intermediate portion of said runner member between said first sliding clearance member and said pivotal connection, wherein said pair of sliding clearance members are mounted on opposite sides of said runner member for contact with opposite ones of said pair of guide surfaces;
wherein each of said sliding clearance members comprises a projecting contact pad having a surface for slidable contact with one of said guide surfaces;
wherein each of said sliding clearance members comprises an adjustable mounting mechanism for adjustably mounting the sliding clearance member on the runner member to maintain substantial uniform contact therebetween essentially throughout an axial width of said contact pad;
wherein each sliding clearance member comprises:
  a clearance contact pad having a surface for slidable contact with one of said guide surfaces; and
  a mounting system supporting the clearance contact pad, for adjustably mounting the clearance contact pad on the runner member, the mounting system including an adjustment system for selectively adjusting the distance between the clearance contact pad and the respective guide surface;
wherein said adjustment system comprises:
  a base configured for supporting the clearance contact pad;
  wherein the runner includes engagement mechanisms for engaging the base at different locations along the length of the runner for selectively adjusting the distance between the clearance contact pad and the guide surface.

7. A liftgate comprising:
a vertically spaced apart parallel pair of vertically extending columns having inner open sides confronting one another, each column including:
  a linear actuator suspended vertically between a pair of guide surfaces;
  a vertically reciprocable runner mechanism telescopically mounted within the column, the runner mechanism comprising a vertically elongate runner member having a pivotal connection to a lower end of said linear actuator to be vertically reciprocated by said actuator;
  a load bearing member at a lower end of said runner member at a location spaced downwardly from said pivotal connection; and
  a vertically extending parallel pair of fixedly spaced apart guide surfaces ;
  a vertically spaced apart pair of sliding clearance members mounted on said runner member for relatively slidable contact with said pair of guide surfaces during vertical reciprocation of said runner member by said actuator, a first one of said sliding clearance members being mounted at an upper end of said runner member, a second of said sliding clearance members being mounted on an intermediate portion of said runner member between said first sliding clearance member and said pivotal connection, wherein said pair of sliding clearance members are mounted on opposite sides of said runner member for contact with opposite ones of said pair of guide surfaces;
wherein each of said sliding clearance members comprises a projecting contact pad having a surface for slidable contact with one of said guide surfaces;
wherein each of said sliding clearance members comprises an adjustable mounting mechanism for adjustably mounting the sliding clearance member on the runner member to maintain substantial uniform contact therebetween essentially throughout an axial width of said contact pad;
wherein each sliding clearance member comprises:
  a clearance contact pad having a surface for slidable contact with one of said guide surfaces; and
  a mounting system supporting the clearance contact pad, for adjustably mounting the clearance contact pad on the runner member, the mounting system including an adjustment system for selectively adjusting the distance between the clearance contact pad and the respecting guide surface; and
wherein said adjustment system comprises:
  a base configured for supporting the clearance contact pad; and
  a tapered spacer mounted on the runner opposite a guide surface, the spacer including engagement mechanisms for engaging the base at different locations along the length of the spacer for selectively adjusting the distance between the clearance contact pad and the guide surface.

8. The liftgate of claim 7, further comprising:
a platform section having a pivotal connection along a forward edge thereof to lower ends of said pair of runner members at the load bearing members for movement between a substantially vertically erect position and a rearwardly projecting horizontal load bearing position.

9. The liftgate of claim 7, further comprising:
a pair of load contact members, wherein a load contact member comprises:
  a load contact pad having a substantially planar surface for slidable contact with one of said guide surfaces; and
  a mounting system including a base supporting the load contact pad, for mounting the load contact pad on the runner member substantially opposite a corresponding sliding clearance member.

10. The liftgate of claim 9, wherein:
each sliding clearance member comprises a clearance contact pad having a substantially planar surface for slidable contact with one of said guide surfaces.

11. The liftgate of claim 10, wherein:

a first one of said sliding clearance members is at a rear side of said lift;

a second one of said sliding clearance members is at a forward side of said lift; and said load bearing member is configured to support a load at said rear side of said lift for biasing, via said runner member, said second clearance contact member against a front one of said guide surfaces and biasing said second clearance contact member against a rear one of said guide surfaces.

12. The liftgate of claim 11, wherein:

each of said guide surfaces comprises a curved track surface for contact with one of said clearance contact pads; and said pair of sliding clearance members and said pivotal connection of said runner member are so oriented relative to one another such that said longitudinal axis of said runner member is misaligned relative to a longitudinal axis of said guide surfaces.

13. A liftgate comprising:

a vertically spaced apart parallel pair of vertically extending columns having inner open sides confronting one another, each column including:

a linear actuator suspended vertically between a pair of guide surfaces;

a vertically reciprocable runner mechanism telescopically mounted within the column, the runner mechanism comprising a vertically elongate runner member having a pivotal connection to a lower end of said linear actuator to be vertically reciprocated by said actuator;

a load bearing member at a lower end of said runner member at a location spaced downwardly from said pivotal connection; and a vertically extending parallel pair of fixedly spaced apart guide surfaces ;

a vertically spaced apart pair of sliding clearance members mounted on said runner member for relatively slidable contact with said pair of guide surfaces during vertical reciprocation of said runner member by said actuator, a first one of said sliding clearance members being mounted at an upper end of said runner member, a second of said sliding clearance members being mounted on an intermediate portion of said runner member between said first sliding clearance member and said pivotal connection, wherein said pair of sliding clearance members are mounted on opposite sides of said runner member for contact with opposite ones of said pair of guide surfaces;

wherein each of said sliding clearance members comprises a projecting contact pad having a surface for slidable contact with one of said guide surfaces;

wherein each of said sliding clearance members comprises an adjustable mounting mechanism for adjustably mounting the sliding clearance member on the runner member to maintain substantial uniform contact therebetween essentially throughout the axial width of said contact pad;

wherein each sliding clearance member comprises:

a clearance contact pad having a surface for slidable contact with one of said guide surfaces; and a mounting system supporting the clearance contact pad, for adjustably mounting the clearance contact pad on the runner member, the mounting system including an adjustment system for selectively adjusting the distance between the clearance contact pad and the respective guide surface; and wherein said adjustment system comprises:

a base configured for supporting the clearance contact pad;

wherein the runner includes engagement mechanisms for engaging the base at different locations along the length of the runner for selectively adjusting the distance between the clearance contact pad and the guide surface.

* * * * *